United States Patent
Hall et al.

(10) Patent No.: US 11,802,490 B2
(45) Date of Patent: *Oct. 31, 2023

(54) CONTROLLABLE VARIABLE FAN OUTLET GUIDE VANES

(71) Applicant: Rolls-Royce Corporation, Indianapolis, IN (US)

(72) Inventors: Christopher D. Hall, Danville, IN (US); William B. Bryan, Indianapolis, IN (US); Daniel E. Molnar, Jr., Lebanon, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,218

(22) Filed: Aug. 25, 2021

(65) Prior Publication Data
US 2023/0060832 A1   Mar. 2, 2023

(51) Int. Cl.
*F01D 17/16* (2006.01)
*F01D 7/02* (2006.01)
*F01D 17/06* (2006.01)

(52) U.S. Cl.
CPC ............ *F01D 17/162* (2013.01); *F01D 7/02* (2013.01); *F01D 17/06* (2013.01); *F05D 2240/12* (2013.01); *F05D 2250/90* (2013.01); *F05D 2260/56* (2013.01)

(58) Field of Classification Search
CPC . F01D 17/162; F05D 2240/12; F05D 2250/90
See application file for complete search history.

(56) References Cited

U.S. PATENT DOCUMENTS

| | | | | |
|---|---|---|---|---|
| 2,924,375 A | * | 2/1960 | McKissock | F01D 17/162 415/150 |
| 3,861,822 A | * | 1/1975 | Wanger | F04D 29/563 415/162 |
| 3,887,297 A | | 6/1975 | Welchek | |
| 4,080,785 A | * | 3/1978 | Koff | F02K 3/077 60/226.3 |
| 4,546,606 A | * | 10/1985 | Bouiller | F01D 17/162 60/262 |
| 4,705,452 A | | 11/1987 | Karadimas | |
| 5,259,187 A | * | 11/1993 | Dunbar | F02K 3/06 60/226.3 |
| 5,692,879 A | * | 12/1997 | Charbonnel | F04D 29/563 415/162 |

(Continued)

*Primary Examiner* — Brian Christopher Delrue
(74) *Attorney, Agent, or Firm* — Barnes & Thornburg LLP

(57) ABSTRACT

A fan assembly includes a fan duct, an inlet fan, and an outlet guide vane assembly. The inlet fan includes blades adapted to force fan exit air toward an aft end of the fan duct. The outlet guide vane assembly is located in the fan duct downstream of the inlet fan and is configured to adjust a direction of the fan exit air received from the blades. The outlet guide vane assembly includes a first plurality of outlet guide vanes including a first outlet guide vane configured to rotate to a first angle so as to redirect the fan exit air in a first direction and a second outlet guide vane configured to rotate to a second angle so as to redirect the fan exit air in a second direction. The second outlet guide vane is located at a different circumferential position than the first outlet guide vane.

17 Claims, 12 Drawing Sheets

(56) References Cited

U.S. PATENT DOCUMENTS

| | | | |
|---|---|---|---|
| 5,794,432 A * | 8/1998 | Dunbar | F02K 1/16 60/226.1 |
| 5,993,152 A * | 11/1999 | Schilling | F01D 17/162 415/155 |
| 6,179,559 B1 | 1/2001 | Weaver | |
| 6,619,916 B1 | 9/2003 | Capozzi et al. | |
| 7,730,714 B2 | 6/2010 | Wood et al. | |
| 8,066,474 B1 | 11/2011 | Jansen et al. | |
| 8,333,546 B2 | 12/2012 | Colotte et al. | |
| 8,641,367 B2 | 2/2014 | Norris et al. | |
| 9,103,228 B2 | 8/2015 | Waugh et al. | |
| 9,157,366 B2 | 10/2015 | Bernard | |
| 9,885,291 B2 | 2/2018 | Lecordix et al. | |
| 10,167,872 B2 * | 1/2019 | Davidson | F04D 29/563 |
| 10,259,565 B2 | 4/2019 | Ramakrishnan et al. | |
| 10,288,079 B2 | 5/2019 | Skertic | |
| 10,711,626 B2 | 7/2020 | Humhauser et al. | |
| 10,737,801 B2 | 8/2020 | Sands et al. | |
| 10,794,281 B2 | 10/2020 | Nestico et al. | |
| 10,815,802 B2 * | 10/2020 | Prasad | F01D 9/041 |
| 11,168,580 B2 * | 11/2021 | Avola | F02M 26/05 |
| 2005/0147492 A1 | 7/2005 | Mahoney et al. | |
| 2006/0263206 A1 * | 11/2006 | Bouru | F01D 17/162 415/159 |
| 2007/0119150 A1 | 5/2007 | Wood et al. | |
| 2009/0297334 A1 | 12/2009 | Norris et al. | |
| 2010/0014977 A1 | 1/2010 | Shattuck | |
| 2011/0167792 A1 * | 7/2011 | Johnson | F01D 17/162 60/226.3 |
| 2012/0163960 A1 | 6/2012 | Ress et al. | |
| 2013/0276425 A1 | 10/2013 | Rittenhouse | |
| 2013/0319009 A1 | 12/2013 | Parente | |
| 2014/0075956 A1 * | 3/2014 | Patsouris | F02C 6/08 60/785 |
| 2016/0069275 A1 * | 3/2016 | Lecordix | F02C 9/22 415/146 |
| 2016/0333729 A1 | 11/2016 | Miller et al. | |
| 2016/0376918 A1 * | 12/2016 | Swann | F02C 3/04 60/772 |
| 2017/0218842 A1 | 8/2017 | Nestico et al. | |
| 2020/0088108 A1 | 3/2020 | Klein et al. | |

* cited by examiner

CONTROLLABLE VARIABLE FAN OUTLET GUIDE VANES

STATEMENT REGARDING FEDERALLY SPONSORED RESEARCH OR DEVELOPMENT

Embodiments of the present disclosure were made with government support under Contract No. FA8650-19-F-2078 awarded by the U.S. Air Force. The government may have certain rights.

FIELD OF THE DISCLOSURE

The present disclosure relates generally to gas turbine engines, and more specifically to fan assemblies of gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion are exhausted out of the turbine and may provide thrust in some applications.

Gas turbine engines also typically include a fan positioned within an inlet duct of the gas turbine engine. The fan includes rotating blades that that force air into the compressor section of the engine, as well as potentially providing additional thrust via forcing air around the engine core through bypass ducts. The fan blades may experience various operability issues due to factors such as variations in the intake airflow and pressure fluctuations within the inlet and the bypass ducts.

SUMMARY

The present disclosure may comprise one or more of the following features and combinations thereof.

A fan assembly for a gas turbine engine according to the present disclosure includes a fan duct arranged circumferentially around a central axis, an inlet fan, and an outlet guide vane assembly. The inlet fan includes a plurality of fan blades that extend radially outward relative to the central axis and that are adapted to rotate about the central axis to force fan exit air toward an aft end of the fan duct. The outlet guide vane assembly is located in the fan duct axially downstream of the inlet fan and configured to adjust a direction of the fan exit air received from the plurality of fan blades.

The outlet guide vane assembly includes a first plurality of variable-pitch outlet guide vanes including at least one first variable-pitch outlet guide vane and at least one second variable-pitch outlet guide vane that each extend radially outward relative to the central axis, the first variable-pitch outlet guide vane being configured to rotate about a first pitch axis to a first vane-pitch angle in response to the gas turbine engine operating at a given operating condition so as to redirect the fan exit air in a first direction, the at least one second variable-pitch outlet guide vane being located at a different circumferential position than the first variable-pitch outlet guide vane and being configured to rotate about a second pitch axis to a second vane-pitch angle in response to the gas turbine engine operating at the given operating condition so as to redirect the fan exit air in a second direction.

In some embodiments, the fan assembly further includes a control system configured to rotate the first plurality of variable-pitch outlet guide vanes. The control system is configured to rotate the at least one first variable-pitch outlet guide vane of the first plurality of variable-pitch outlet guide vanes to the first vane-pitch angle and to rotate the at least one second variable-pitch outlet guide vane of the second plurality of variable-pitch outlet guide vanes to the second vane-pitch angle.

In some embodiments, the first vane-pitch angle is different than the second vane-pitch angle.

In some embodiments, the at least one first variable-pitch outlet guide vane of first plurality of variable-pitch outlet guide vanes is individually controllable by the control system and the at least one second variable-pitch outlet guide vane of first plurality of variable-pitch outlet guide vanes is individually controllable via the control system.

In some embodiments, the at least one first variable-pitch outlet guide vane of first plurality of variable-pitch outlet guide vanes includes at least two variable-pitch outlet guide vanes that are each mechanically connected to each other, and wherein the at least one second variable-pitch outlet guide vane of first plurality of variable-pitch outlet guide vanes is individually controllable via the control system.

In some embodiments, the at least one first variable-pitch outlet guide vane of first plurality of variable-pitch outlet guide vanes includes at least two variable-pitch outlet guide vanes that are ganged with each other.

In some embodiments, the fan assembly further includes a first connector arm that extends at least partially circumferentially about the central axis and that is coupled to each variable-pitch outlet guide vane of the at least two variable-pitch outlet guide vanes so as to gang the at least two variable-pitch outlet guide vanes together.

In some embodiments, the fan assembly further includes at least one first actuator operably coupled to the first connector arm, the at least one first actuator being configured to rotate at least one first variable-pitch outlet guide vane of the at least two variable-pitch outlet guide vanes so as to rotate every other first variable-pitch outlet guide vane of the of the at least two variable-pitch outlet guide vanes via the first connector arm.

In some embodiments, the at least one first variable-pitch outlet guide vane of first plurality of variable-pitch outlet guide vanes includes at least two first variable-pitch outlet guide vanes that are each mechanically connected to each other, and the at least one second variable-pitch outlet guide vane of first plurality of variable-pitch outlet guide vanes includes at least two second variable-pitch outlet guide vanes that are each mechanically connected to each other.

In some embodiments, the at least two first variable-pitch outlet guide vanes of the at least one first variable-pitch outlet guide vane of first plurality of variable-pitch outlet guide vanes are ganged with each other, and the at least two second variable-pitch outlet guide vanes of the at least one second variable-pitch outlet guide vane of second plurality of variable-pitch outlet guide vanes are ganged with each other.

In some embodiments, the fan assembly further includes at least one third variable-pitch outlet guide vane that extends radially outward relative to the central axis, the third variable-pitch outlet guide vane being located at a different circumferential position than the first variable-pitch outlet guide vane and the second variable-pitch outlet guide vane, the third variable-pitch outlet guide vane being configured to rotate about a third pitch axis to a third vane-pitch angle in response to the gas turbine engine operating at the given operating condition so as to redirect the fan exit air in a third direction.

In some embodiments, the third vane-pitch angle is different than the first vane-pitch angle and the second vane-pitch angle.

In some embodiments, the at least one third variable-pitch outlet guide vane of first plurality of variable-pitch outlet guide vanes includes at least two third variable-pitch outlet guide vanes, wherein the at least two third variable-pitch outlet guide vanes are one of (i) each mechanically connected to each other and (ii) individually controllable via the control system.

In some embodiments, the fan assembly further includes a second plurality of variable-pitch outlet guide vanes located axially downstream of the first plurality of variable-pitch outlet guide vanes and including at least one third variable-pitch outlet guide vane and at least one fourth variable-pitch outlet guide vane that each extend radially outward relative to the central axis, the third variable-pitch outlet guide vane being configured to rotate, via the control system, about a third pitch axis to a third vane-pitch angle in response to the gas turbine engine operating at a given operating condition so as to redirect the fan exit air in a third direction, the fourth variable-pitch outlet guide vane being located at a different circumferential position than the third variable-pitch outlet guide vane and being configured to rotate about a fourth pitch axis to a fourth vane-pitch angle in response to the gas turbine engine operating at the given operating condition so as to redirect the fan exit air in a fourth direction.

In some embodiments, at least one of the at least one first variable-pitch outlet guide vane and the at least one second variable-pitch outlet guide vane includes a leading edge portion configured to rotate about the first pitch axis and a trailing edge portion rotatably coupled to an axially aft edge of the leading edge portion and configured to rotate relative to the leading edge portion about a trailing edge pitch axis that is parallel to the leading edge pitch axis According to another aspect of the present disclosure, a fan assembly for a gas turbine engine includes a fan duct arranged circumferentially around a central axis, an inlet fan, and an outlet guide vane assembly. The inlet fan includes a plurality of fan blades adapted to force an airflow toward an aft end of the fan duct.

In some embodiments, the outlet guide vane assembly is located in the fan duct axially downstream of the inlet fan, the outlet guide vane assembly including a first plurality of variable-pitch outlet guide vanes including at least one first variable-pitch outlet guide vane and at least one second variable-pitch outlet guide vane, the first variable-pitch outlet guide vane being configured to rotate in response to the gas turbine engine operating at a given operating condition so as to redirect the fan exit air in a first direction, the second variable-pitch outlet guide vane being located at a different circumferential position than the first variable-pitch outlet guide vane and being configured to rotate in response to the gas turbine engine operating at the given operating condition so as to redirect the fan exit air in a second direction.

In some embodiments, the fan assembly further includes a control system configured to rotate the first plurality of variable-pitch outlet guide vanes. The control system is configured to rotate the at least one first variable-pitch outlet guide vane of the first plurality of variable-pitch outlet guide vanes to a first vane-pitch angle and to rotate the at least one second variable-pitch outlet guide vane of the second plurality of variable-pitch outlet guide vanes to a second vane-pitch angle. The first vane-pitch angle is different than the second vane-pitch angle.

In some embodiments, the at least one first variable-pitch outlet guide vane of first plurality of variable-pitch outlet guide vanes is individually controllable by the control system and the at least one second variable-pitch outlet guide vane of first plurality of variable-pitch outlet guide vanes is individually controllable via the control system.

In some embodiments, the at least one first variable-pitch outlet guide vane of first plurality of variable-pitch outlet guide vanes includes at least two first variable-pitch outlet guide vanes that are each mechanically connected to each other, and the at least one second variable-pitch outlet guide vane of first plurality of variable-pitch outlet guide vanes includes at least two second variable-pitch outlet guide vanes that are each mechanically connected to each other.

A method according to another aspect of the present disclosure includes arranging a fan duct of a fan assembly of a gas turbine engine circumferentially around a central axis and providing an inlet fan of the fan assembly, the inlet fan comprising a plurality of fan blades that extend radially outward relative to the central axis and that are adapted to rotate about the central axis to force fan exit air toward an aft end of the fan duct.

In some embodiments, the method further includes arranging an outlet guide vane assembly in the fan duct axially downstream of the inlet fan, the outlet guide vane assembly configured to adjust a direction of the fan exit air received from the plurality of fan blades, the outlet guide vane assembly including a first plurality of variable-pitch outlet guide vanes including at least one first variable-pitch outlet guide vane and at least one second variable-pitch outlet guide vane that each extend radially outward relative to the central axis, the at least one second variable-pitch outlet guide vane being located at a different circumferential position than the first variable-pitch outlet guide vane.

In some embodiments, the method further includes rotating the at least one first variable-pitch outlet guide vane about a first pitch axis to a first vane-pitch angle in response to the gas turbine engine operating at a given operating condition so as to redirect the fan exit air in a first direction, and rotating the at least one second variable-pitch outlet guide vane about a second pitch axis to a second vane-pitch angle in response to the gas turbine engine operating at the given operating condition so as to redirect the fan exit air in a second direction, the first vane-pitch angle being different than the second vane-pitch angle and the first direction being different than the second direction.

These and other features of the present disclosure will become more apparent from the following description of the illustrative embodiments.

DETAILED DESCRIPTION OF THE DRAWINGS

Figure 1:
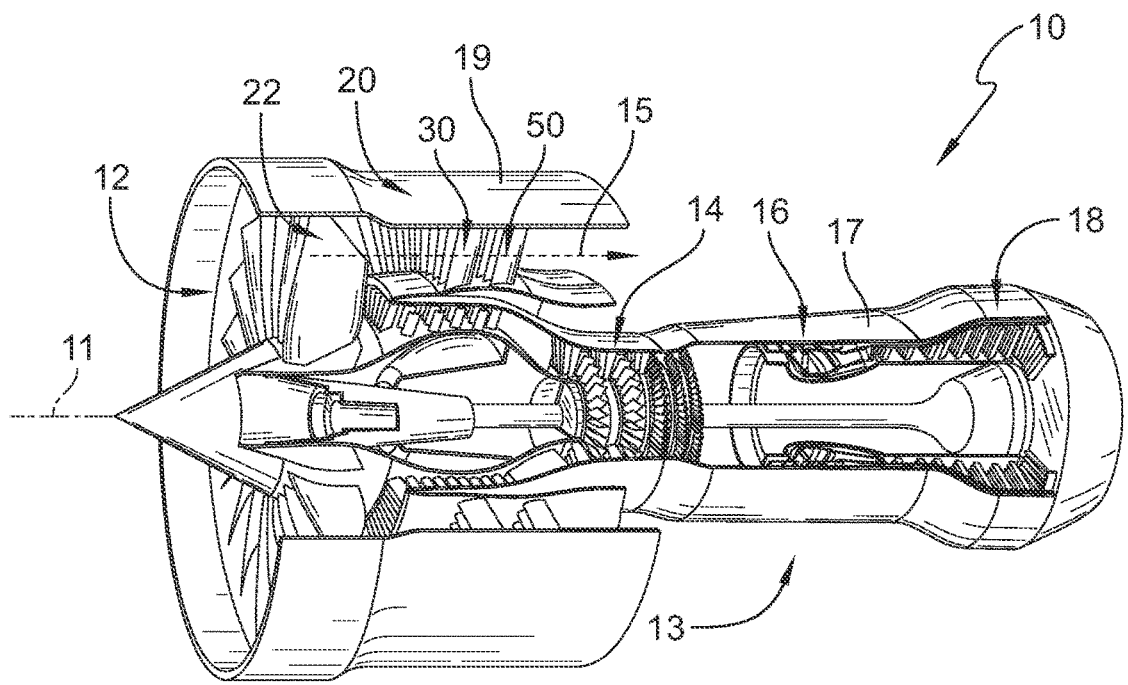
FIG. 1 is a cutaway view of a gas turbine engine that includes a fan assembly having an inlet fan having plurality of fan blades that extend radially outward relative to the central axis, an engine core having a compressor, a combustor, and a turbine, and an outlet guide vane assembly located in a fan duct axially downstream of the plurality of fan blades that is configured to adjust a direction of the fan exit air received from the plurality of fan blades.

For the purposes of promoting an understanding of the principles of the disclosure, reference will now be made to a number of illustrative embodiments illustrated in the drawings and specific language will be used to describe the same.

An illustrative aerospace gas turbine engine 10 includes a fan assembly 12 and an engine core 13 having a compressor 14, a combustor 16, and a turbine 18, as shown in FIG. 1. The fan assembly 12 is driven by the turbine 18 and provides thrust for propelling an air vehicle by forcing fan exit air 15 through a fan duct 20 that circumferentially surrounds an outer casing 17 of the engine core 13. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12. In some embodiments, the fan may be replaced with a propeller, drive shaft, or other suitable configuration.

Figure 2:
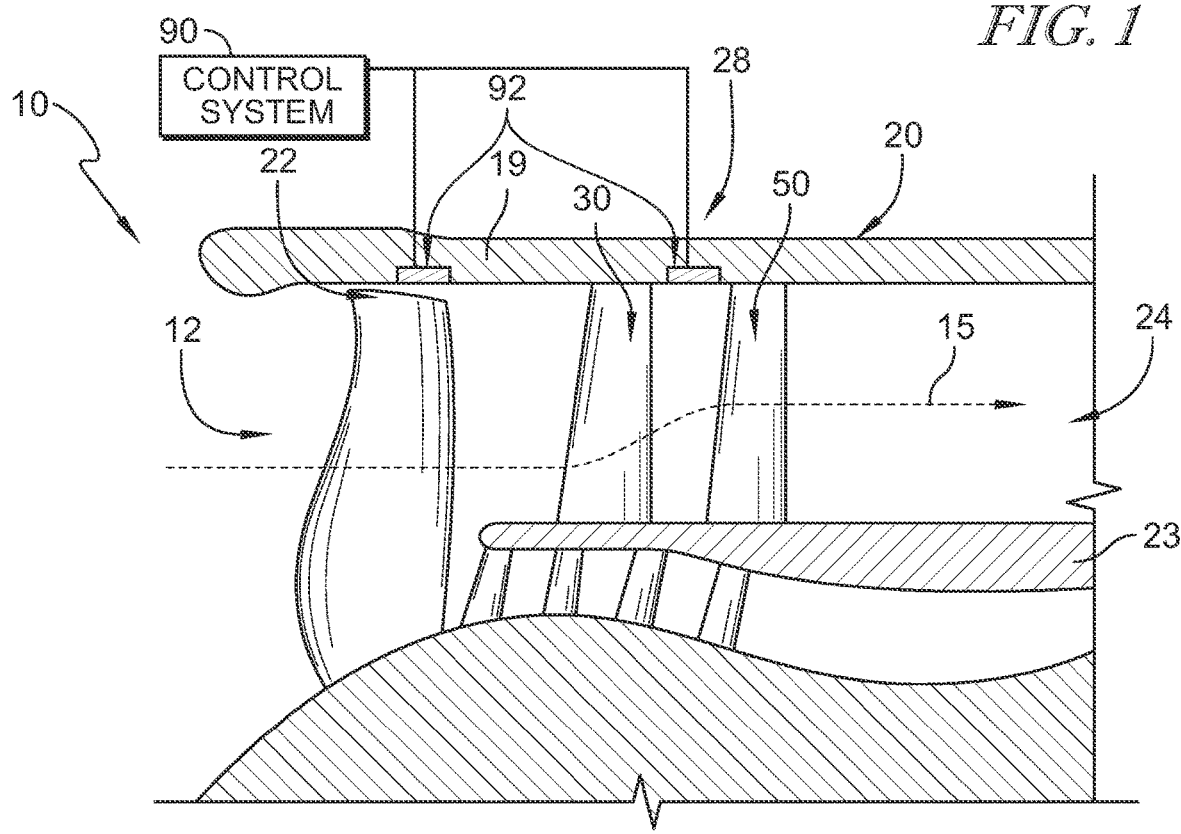
FIG. 2 is a side cross-sectional view of the gas turbine engine of FIG. 1, showing the fan assembly including the plurality of fan blades, showing that the engine further includes an outer casing and an inner wall that define a fan duct passage through which the fan exit air flows, and showing that the outlet guide vane assembly includes a first plurality of variable-pitch outlet guide vanes and a second plurality of variable-pitch outlet guide vanes located axially downstream of the first plurality of variable-pitch outlet guide vanes, the variable-pitch outlet guide vanes being configured to adjust the direction of the fan exit air.

The fan assembly 12 includes an inlet fan having a plurality of fan blades 22 that extend radially outward relative to the central axis 11 and that are located in the inlet of the gas turbine engine 10, as shown in FIGS. 1 and 2. The fan blades 22 direct at least a portion of the air flowing over the blades 22, this portion being fan exit air 15 as shown in FIGS. 1 and 2, through the fan duct 20 such that the fan exit air 15 bypasses the engine core 13 and provides additional thrust for the gas turbine engine 10. The fan duct 20 includes an outer fan duct casing 19 and an inner wall 23 that together define an annular fan duct passage 24 through which the fan exit air 15 flows and subsequently exits the fan duct 20 into the ambient air surrounding the engine 10.

In the illustrative embodiment, the fan assembly 12 further includes outlet guide vane assembly 28 located in the fan duct 20 axially downstream of the plurality of fan blades 22 that is configured to adjust a direction of the fan exit air 15 received from the plurality of fan blades 22, as shown in FIGS. 1-4. In the illustrative embodiment, the outlet guide vane assembly 28 includes a first plurality of variable-pitch outlet guide vanes 30 and a second plurality of variable-pitch outlet guide vanes 50 located axially downstream of the first plurality of variable-pitch outlet guide vanes 30.

Figure 3:
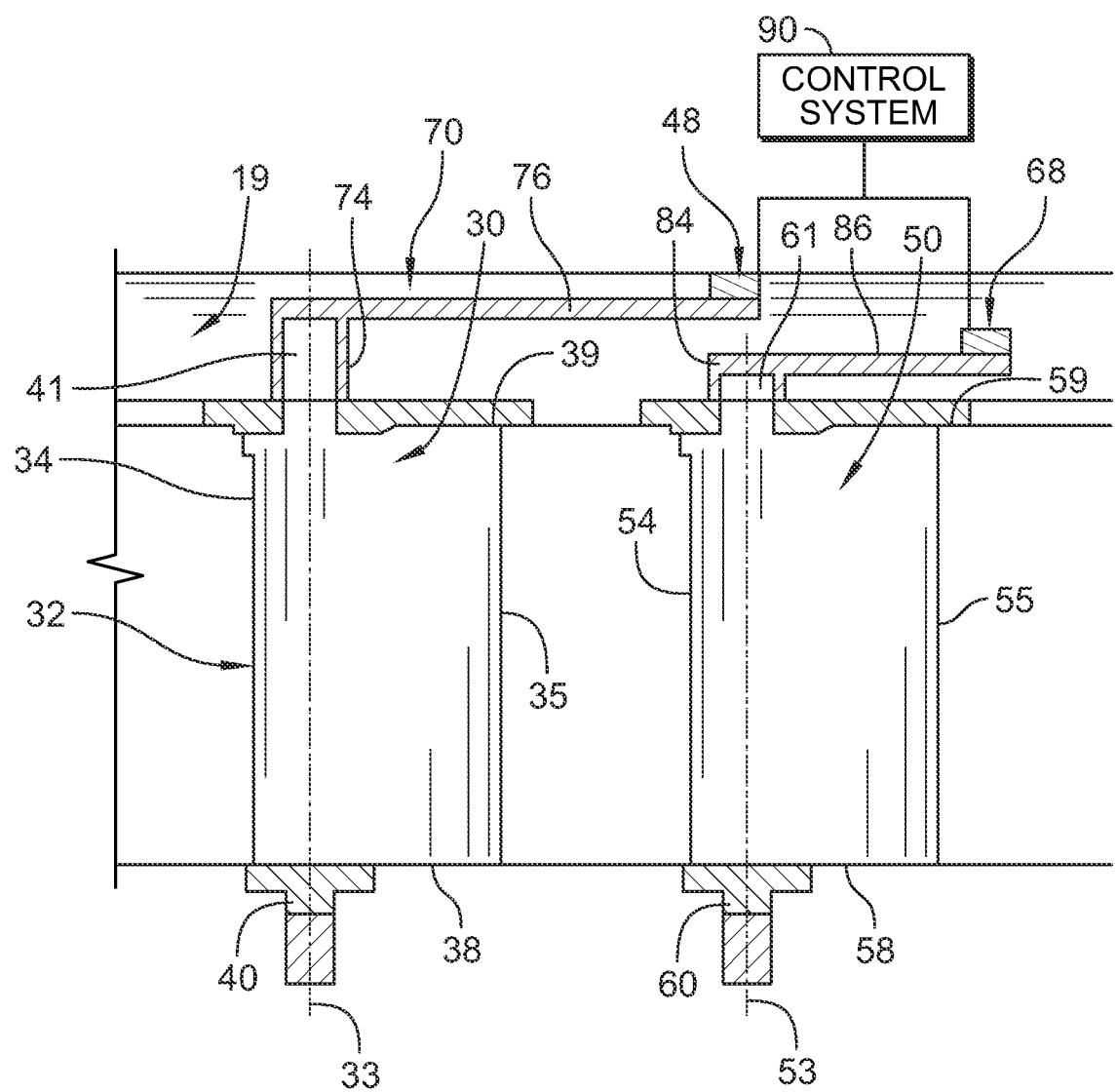
FIG. 3 is a side cross-sectional view of the outlet guide vane assembly of FIG. 2, showing that the first plurality of guide vanes includes at least one first guide vane configured to rotate about a first pitch axis to a first vane-pitch angle in response to the gas turbine engine operating at a given operating condition so as to redirect the fan exit air in a first direction, and showing that the second plurality of guide vanes includes at least one second guide vane configured to rotate about a second pitch axis to a second vane-pitch angle in order to redirect the fan exit air flowing in the first direction in a second direction to minimize losses created by distortions in fan inlet air and created by the first variable-pitch outlet guide vane redirecting the fan exit air in the first direction.

The first plurality of variable-pitch outlet guide vanes 30 includes at least one first variable-pitch outlet guide vane 32 that extends radially outward relative to the central axis 11, as shown in FIG. 3. In the illustrative embodiment, the first plurality of variable-pitch outlet guide vanes 30 includes a plurality of first variable-pitch outlet guide vanes 32 disposed around a circumferential extent of an inner vane hub 31 arranged around the inner wall 23 to define a first vane stage of the fan assembly 12.

Figure 5:
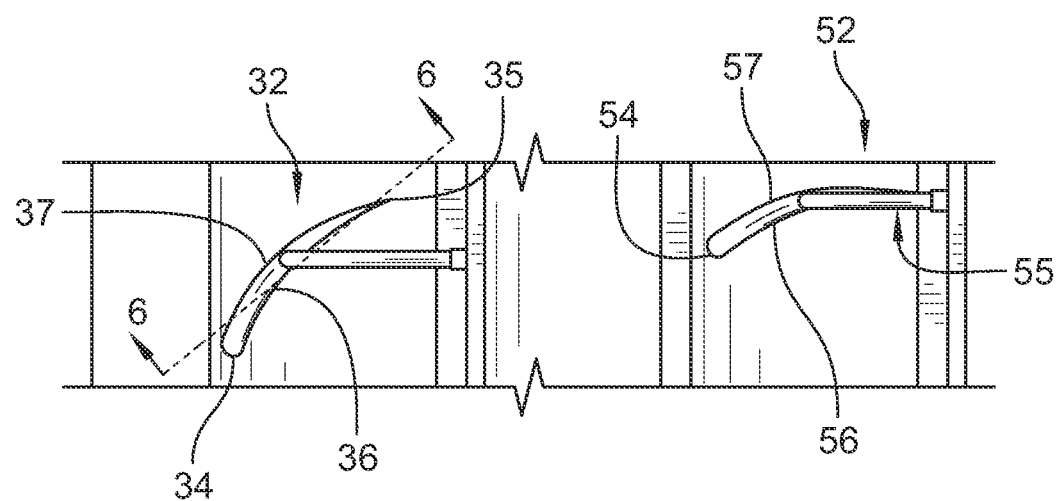
FIG. 5 is a top cross-sectional view of the outlet guide vane assembly of FIGS. 2 and 3, showing a cross-section of a first guide vane of the first plurality of guide vanes and a cross-section of a second guide vane of the second plurality of guide vanes.

Each first variable-pitch outlet guide vane 32 includes an airfoil shape having a leading edge 34 located at a forward end of the vane 32, a trailing edge 35 axially spaced apart from the leading edge 34 and located at an aft end of the vane 32, a pressure side surface 36 that extends between the leading edge 34 and the trailing edge 35 on one side of the vane 32, and a suction side surface 37 that extends between the leading edge 34 and the trailing edge 35 on an opposite side of the vane 32, as shown in FIG. 5.

Each of the variable-pitch outlet guide vanes 32 extends between a root end 38 and a tip end 39, as shown in FIG. 3. The vane 32 includes an inner pivot shaft 40 that extends from the root end 38 and into the inner vane hub 31 and is rotatably arranged therewithin to allow for rotation of the vane 32. The vane 32 further includes an outer pivot shaft 41 that extends from the tip end 39 and is coupled to a first actuator 74 of an actuation assembly 70 located within the outer casing 19. The first actuator 74 is configured to rotate the vane 32 about a first pivot axis 33. The root end 38 is located adjacent the inner wall 23 and the tip end 39 is located adjacent an inner surface of the outer fan duct casing 19 such that vane 32 influences the air flow of the fan exit air 15 along an entirety of a radial extent of the fan exit air 15 flow path through the fan duct 20. The inner wall 23 of the fan duct and the inner surface of the outer fan duct casing 19 define the radially inner and outer bounds of the flow path of the fan exit air 15.

Each first variable-pitch outlet guide vane 32 is configured to rotate about the first pitch axis 33, as shown in FIG. 3. In the illustrative embodiment, the first pitch axis 33 is located closer to the leading edge 34 of the vane 32 than the trailing edge 35. In some embodiments, the first pitch axis 33 is located closer to the trailing edge 35 than the leading edge 34. In some embodiments, the first pitch axis 33 is located centrally between the leading edge 34 and the trailing edge 35.

The actuation assembly 70 includes at least the first actuator 74 and a first actuator support arm 76, as shown in FIG. 3. The first actuator 74 is arranged radially outward from the vane 32 within the outer fan duct casing 19 and is coupled to a forward end of the first actuator support arm 76 so as to align the first actuator 74 with the first pivot axis 33. The first actuator 74 is coupled to the outer pivot shaft 41 so as to control rotation of the vane 32 about the first pivot axis 33. In the illustrative embodiment, the actuation assembly 70 includes a first actuator 74 and a first actuator support arm 76 for each first variable-pitch outlet guide vane 32 of the first plurality of variable-pitch outlet guide vanes 30. In some embodiments, the first plurality of guide vanes 30 may be controlled by a single actuator 74 or multiple actuators 74 that total less than the total number of vanes 32 in the first plurality of vanes 30 that move the connector arm 48, as will be described below.

The first actuator 74 may be a relatively small hydraulic actuator or an electric motor actuator such as a stepper motor. As will be discussed in detail below, sections or even individual vanes 32 of the first plurality of variable-pitch outlet guide vanes 30 may be selectively controlled by a control system 90, and as such, the size of the actuators in the actuation assembly 70 may be smaller than would be expected for a typical system configured to drive an entire vane row. In some embodiments, the vanes 32 of the first plurality of guide vanes 30 are mechanically connected to each other, as shown in FIG. 4, and thus would require larger actuators.

Figure 4A:
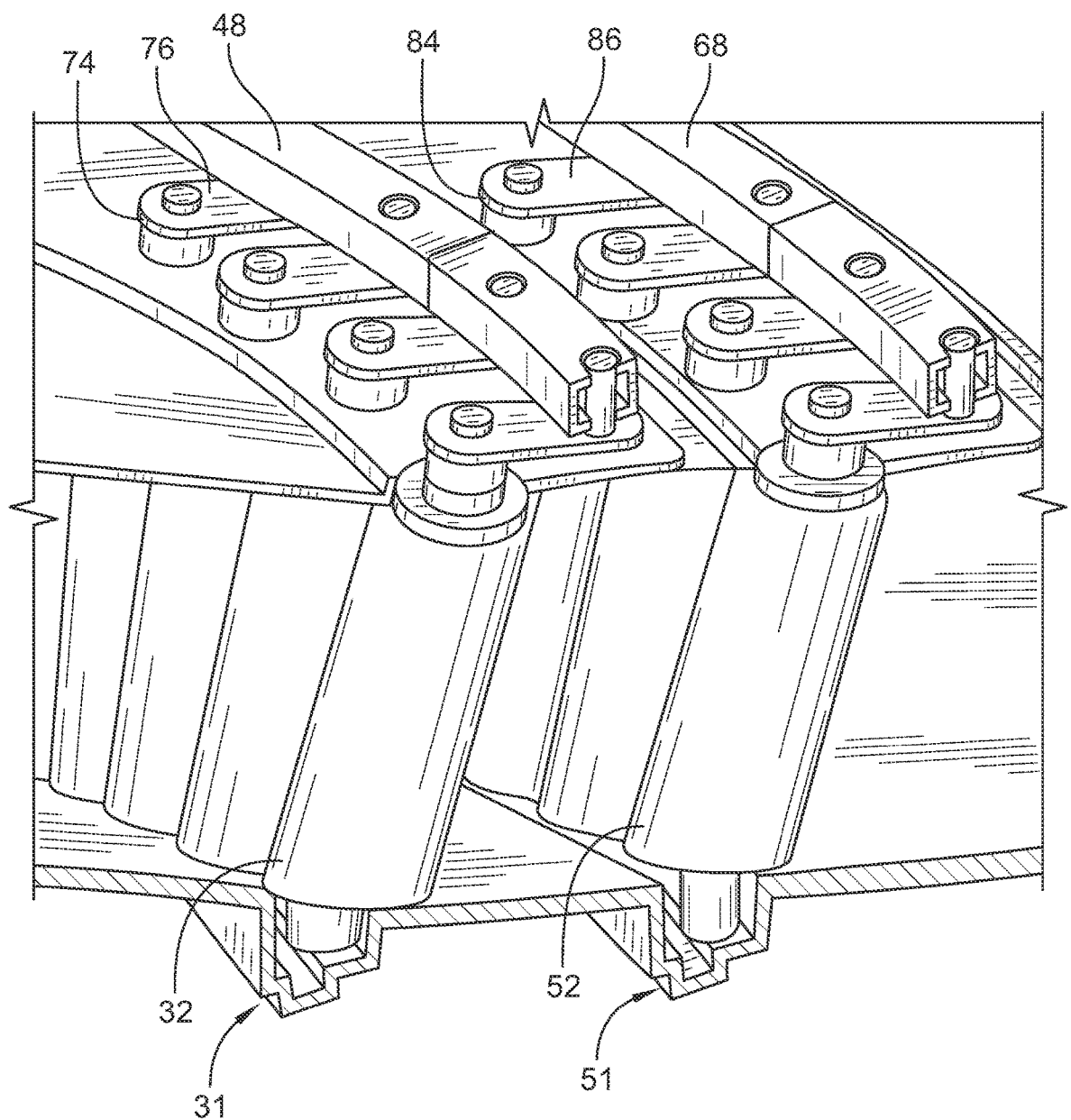
FIG. 4A is a cutaway perspective view of the outlet guide vane assembly of FIGS. 2 and 3, showing the first plurality of guide vanes and the second plurality of guide vanes mechanically coupled to each other.

In some embodiments in which the vanes 32 of the first plurality of variable-pitch outlet guide vanes 30 are mechanically connected to each other, or ganged, the fan assembly 12 may further include a circumferentially extending connector arm 48 that is coupled to vane 32 such that rotation of one of the vanes 32 will rotate the remainder of the vanes 32 of the first plurality of guide vanes 30, as shown in FIG. 4A. Although the circumferentially extending connector arm 48 is shown coupled to the first actuator support arm 76, the circumferentially extending connector arm 48 may be connected to any portion of the vanes 32 outside of the fan duct passage 24 so as to mechanically connect the vanes 32 with each other.

In the illustrative embodiment, the fan assembly 12 further includes the second plurality of variable-pitch outlet guide vanes 50 located axially downstream of the first plurality of variable-pitch outlet guide vanes 30, as shown in FIGS. 1-4. The second plurality of variable-pitch outlet guide vanes 50 includes at least one second variable-pitch outlet guide vane 52 that extends radially outward relative to the central axis 11, as shown in FIG. 3. The second plurality of variable-pitch outlet guide vanes 50 includes a plurality of first variable-pitch outlet guide vanes 52 disposed around a circumferential extent of an inner vane hub 52 arranged around the inner wall 23 to define a second vane stage of the fan assembly 12. In the illustrative embodiment, no additional vanes or blades are positioned axially between the first plurality of guide vanes 30 and the second plurality of guide vanes 50 such that the first plurality of guide vanes 30 and the second plurality of guide vanes 50 are located axially proximal to each other. This arrangement allows the second plurality of guide vanes 50 to directly influence the flow of the fan exit air 15 after the air 15 has passed over the first plurality of guide vanes 30.

Each second variable-pitch outlet guide vane 52 includes an airfoil shape having a leading edge 54 located at a forward end of the vane 52, a trailing edge 55 axially spaced apart from the leading edge 54 and located at an aft end of the vane 52, a pressure side surface 56 that extends between the leading edge 54 and the trailing edge 55 on one side of the vane 52, and a suction side surface 57 that extends between the leading edge 54 and the trailing edge 55 on an opposite side of the vane 52, as shown in FIG. 5.

Each of the second variable-pitch outlet guide vanes 52 extend between a root end 58 and a tip end 59, as shown in FIG. 3. The vane 52 includes an inner pivot shaft 60 that extends from the root end 58 and into the inner vane hub 51 and is rotatably arranged therewithin to allow for rotation of the variable-pitch outlet guide vane 52. In some embodiments, the second guide vanes 52 are sized to have the same radial height as the first guide vanes 32, and the fan duct passage 24 has a constant radial height along its axial extent. In other embodiments in which the radial height of the fan duct passage 24 is not constant along its axial extent, the second variable-pitch outlet guide vanes 52 may be sized to have a larger or smaller radial height as the first guide vanes 32 in order to account for the variations in the radial height of the fan duct passage 24. In some embodiments the first pitch axis 33 is parallel with the second pitch axis 53.

The vane 52 further includes an outer pivot shaft 61 that extends from the tip end 59 and is coupled to a second actuator 84 of an actuation assembly 70 located within the outer casing 19. The second actuator 84 is configured to rotate the guide vane 52 about a second pivot axis 53. The root end 58 is located adjacent the inner wall 23 and the tip end 59 is located adjacent an inner surface of the outer fan duct casing 19 such that vane 52 influences the air flow of the fan exit air 15 along an entirety of a radial extent of the fan exit air 15 flow path through the fan duct 20. The inner wall 23 of the fan duct and the inner surface of the outer fan duct casing 19 define the radially inner and outer bounds of the flow path of the fan exit air 15.

Each second variable-pitch outlet guide vane 52 is configured to rotate about the second pitch axis 53, as shown in FIG. 3. In the illustrative embodiment, the second pitch axis 53 is located closer to the leading edge 54 of the vane 52 than the trailing edge 55. In some embodiments, the second pitch axis 53 is located closer to the trailing edge 55 than the leading edge 54. In some embodiments, the second pitch axis 53 is located centrally between the leading edge 54 and the trailing edge 55.

The actuation assembly 70 includes the second actuator 84 and a second actuator support arm 86 in addition to the first actuator 84 and the second actuator support arm 86, as shown in FIG. 3. The second actuator 84 is arranged radially outward from the vane 52 within the outer fan duct casing 19 and is coupled to a forward end of the second actuator support arm 86 so as to align the second actuator 84 with the second pivot axis 53. The first actuator 84 is coupled to the outer pivot shaft 61 so as to control rotation of the vane 52 about the second pivot axis 53. In the illustrative embodiment, the actuation assembly 70 includes a second actuator 84 and a second actuator support arm 86 for each second guide vane 52 of the second plurality of guide vanes 50. In some embodiments, the second plurality of guide vanes 50 may be controlled by a second actuator 84 or multiple actuators 84 that total less than the total number of vanes 52 in the second plurality of vanes 50 that move the connector arm 68, as will be described below.

The second actuator 84 may be a relatively small hydraulic actuator or an electric motor actuator such as a stepper motor. As will be discussed in detail below, sections or even individual vanes 52 of the second plurality of variable-pitch outlet guide vanes 50 may be selectively controlled by a control system 90, and as such, the size of the actuators in the actuation assembly 70 may be smaller than would be expected for a typical system configured to drive an entire vane row. In some embodiments, the vanes 52 of the second plurality of guide vanes 50 are mechanically connected to each other, as shown in FIG. 4, and thus would require larger actuators.

In some embodiments in which the vanes 52 of the second plurality of variable-pitch outlet guide vanes 50 are mechanically connected to each other, or ganged, the fan assembly 12 may further include a circumferentially extending connector arm 68 that is coupled to vane 52 such that rotation of one of the vanes 52 will rotate the remainder of the vanes 52 of the second plurality of guide vanes 50, as shown in FIG. 4A. Although the circumferentially extending connector arm 68 is shown coupled to the second actuator support arm 86, the circumferentially extending connector arm 68 may be connected to any portion of the vanes 52 outside of the fan duct passage 24 so as to mechanically connect the vanes 52 with each other. In some embodiments, as shown in FIG. 3, each first actuator arm 76 extends from the respective first variable-pitch outlet guide vane to the first connector arm 48 axially aft and beyond leading edges 54 of the second plurality of variable-pitch outlet guide vanes 50. As a result, the connector arms 48 are also located axially aft of the leading edges 54 of the vanes 50.

In the illustrative embodiment, the first plurality of outlet guide vanes 30 includes the same number of vanes 32 around the circumference of the first plurality of outlet guide vanes 30 as the number of vanes 52 of the second plurality of outlet guide vanes 50. In other embodiments, the first plurality of outlet guide vanes 30 includes a greater number of vanes 32 around the circumference of the first plurality of outlet guide vanes 30 than the number of vanes 52 of the second plurality of outlet guide vanes 50. In other embodiments, the first plurality of outlet guide vanes 30 includes a lower number of vanes 32 around the circumference of the first plurality of outlet guide vanes 30 than the number of vanes 52 of the second plurality of outlet guide vanes 50.

The control system 90 is configured to control rotation of the first plurality of variable-pitch outlet guide vanes 30 and the second plurality of variable-pitch outlet guide vanes 50, as shown in FIG. 3. In particular, the control system 90 is configured to selectively control rotation of the first and second actuators 74, 84 of each vane 32, 52 so as to control the angle of incidence of the vanes 32 relative to the flow direction of the fan exit air 15 after it passes over the fan blades 22, and also control the angle of incidence of the vanes 52 relative to the flow direction of the fan exit air 15 after it passes over the vanes 32. As a result, the control system 90 is configured to control the overall flow of the fan exit air 15 after it passes over and exits the fan blades 22 in order to control fan blade 22 response to forces acting on the fan blades 22, as well as to reduce losses created by undesirable variations in the air flow. Moreover, because the fan exit air 15 may not be uniform as it exits the fan blades 22, the outlet vanes 30, 50 or the axial passages therebetween operate further from their ideal design conditions. By adjusting the plurality of outlet vanes 30, 50, parameters such as incidence are improved, and detrimental flow conditions and losses in the outlet vanes 30, 50 or the axial passages therebetween such as vortices and stall are reduced.

In some embodiments, the control system 90 is configured to rotate each vane 32 of the first plurality of variable-pitch outlet guide vanes 30 to a first vane-pitch angle in response to the gas turbine engine 10 operating at a given operating condition so as to redirect the fan exit air 15 in a first direction. In particular, the operating condition in which the fan assembly 12 and gas turbine engine 10 are operating in may include at least one of take-off, climb, cruise, descent, and landing of an aircraft having the engine 10 equipped. In each of these operating conditions, the plurality of fan blades 22 and/or the outlet vanes 30 of the fan assembly 12 may experience various undesirable operability issues such as forcing, stall, and flutter. For example, the engine 10 may operate in particular speed ranges for each of the operating conditions, and as result, the fan blades 22 may experience greater or lower levels of forcing, stall, and/or flutter in response to the engine 10 operating in particular speed ranges.

In order to compensate for these forces acting on the fan blades 22, the control system 90 is configured to rotate the first plurality of variable-pitch outlet guide vanes 30 to an arrangement of first vane-pitch angles in order to alter the angle of the flow of fan exit air 15 after it exits the fan blades 22. This change in the angle of flow as the fan exit air 15 passes over the first plurality of variable-pitch outlet guide vanes 30 reduces the amount of forcing, stall, and/or flutter experienced by the fan blades 22 and/or the outlet guide vanes 30. Moreover, the control system 90 is configured to reset a desired incidence of air flow into the first plurality of variable-pitch outlet guide vanes 30 in response to swirl in the inlet flow. This, along with the second plurality of variable-pitch outlet guide vanes 50 redirecting the fan exit air 15 to an axial flow, produces an averaging effect that improves engine performance and efficiency.

In order to recover the losses created by flow separation, flow distortions, vortices, and/or swirl, the control system 90 is configured to rotate the second plurality of variable-pitch outlet guide vanes 50 to an arrangement of second vane-pitch angles in order to alter the angle of the flow of fan exit air 15 after it exits the first plurality of variable-pitch outlet guide vanes 30. In the illustrative embodiment, the control system 90 is configured to rotate the vanes 52 of the second plurality of variable-pitch outlet guide vanes 50 to redirect the fan exit air 15 in a second direction different than the first direction such that the fan exit air 15 returns to an axial, uniform flow direction, or as close to axial and uniform as possible given the air flow and operating conditions. This change in the angle of flow as the fan exit air 15 passes over the second plurality of variable-pitch outlet guide vanes 50 further reduces the losses created by inlet flow distortion, vortices, and swirl.

The control system 90 is operable to control the first plurality of variable-pitch outlet guide vanes 30 and the second plurality of variable-pitch outlet guide vanes 50 in a variety of configurations and arrangements in order to compensate for inlet pressure distortion, vortices and swirl, thus reducing the forcing, stall, flutter, flow separation, and any other undesirable effects in the fan rotor or outlet vanes. For example, in some embodiments, the control system 90 is configured to rotate each vane 32 of the first plurality of guide vanes 30 in unison and is further configured to rotate each second vane 52 of the second plurality of guide vanes 50 in unison. In other words, all of the first plurality of guide vanes 30 move to the same first vane-pitch angle and all of the second plurality of guide vanes 50 move to the same second vane-pitch angle. In such embodiments, the each vane 32 of the first and each vane 52 of the second plurality of guide vanes 30, 50 may be mechanically connected to each other such that not every actuator 74, 84 is required to rotate the vanes, or each vane 32 is rotated individually to the same first vane-pitch angle and each vane 52 is rotated individually to the same second vane-pitch angle, as will be described in detail below. This would require each actuator 74, 84 to actuate the individual vanes 32, 52.

In some embodiments, the control system is further configured to rotate each vane 32 of the first plurality of guide vanes 30 individually relative to each other vane 32, and/or to rotate each vane 52 of the second plurality of guide vanes 50 individually relative to each other vane 52. That is to say, each vane 32, 52 may be rotated without moving any of the other vanes of the first and second plurality of guide vanes 30, 50. This allows for the vanes 32, 52 to be controlled in a variety of configurations. For example, one of the first and second plurality variable-pitch outlet guide vanes 30, 50 may be controlled to be rotated in unison, while the other of the first and second plurality of guide vanes 30, 50 has individually controlled vanes 32, 52. In this scenario, the other of the first and second plurality of guide vanes 30, 50 having individually controlled vanes 32, 52 may account for variations in the fan exit air 15 around the circumference of the area between the first and second plurality of guide vanes 30, 50.

For example, if the rotation of the first plurality of guide vanes 30 causes more undesirable flow effects in certain circumferential sectors, the second plurality of guide vanes 50 may be rotated to different vane-pitch angles to reduce losses from said flow effects. The second plurality of guide vanes 50 may be each rotated individually to different vane-pitch angles to account for this. In other embodiments, the second plurality of guide vanes 50 may be grouped into circumferential sectors, where each vane 52 of each circumferential sector is rotated to a unique vane-pitch angle. In other embodiments, the first plurality of guide vanes 30 may be rotated individually to different vane-pitch angels or by circumferential sectors such that the second plurality of guide vanes 50 may be rotated in unison to most efficiently reduce losses created by the fan exit air 15 flowing over the fan blades 22 and through the first plurality of guide vanes 30.

In some embodiments, the control system 90 is configured to rotate at least two different groups of outlet guide vanes 32, 52. For example, the control system 90 may be configured to selectively rotate each group of outlet guide vanes 32, 52 to create non-uniform backpressure that drives the fan inlet distortion flows within the inlet fan to change or redistribute around the circumference of the inlet fan. This locally reduces loading on fan blades 22 within a lip separated flow with low local pressure to reduce forcing and/or improve the uniformity of flow in general through the fan to reduce forcing. In particular, fully opening (allowing full flow through the guide vanes) at least one group of outlet guide vanes 32, 52 and fully closing at least one further group of outlet guide vanes 32, 52 (allowing no flow through the guide vanes) reduces a tendency for a local stall of the fan blades 22 that could lead to early overall stall in the fan. In some embodiments, the control system 90 is configured to rotate a large group of outlet guide vanes 32, 52 which counters bulk swirling flows or local changes to improve localized intake swirl gradients to improve fan performance and operability.

Figure 4B:
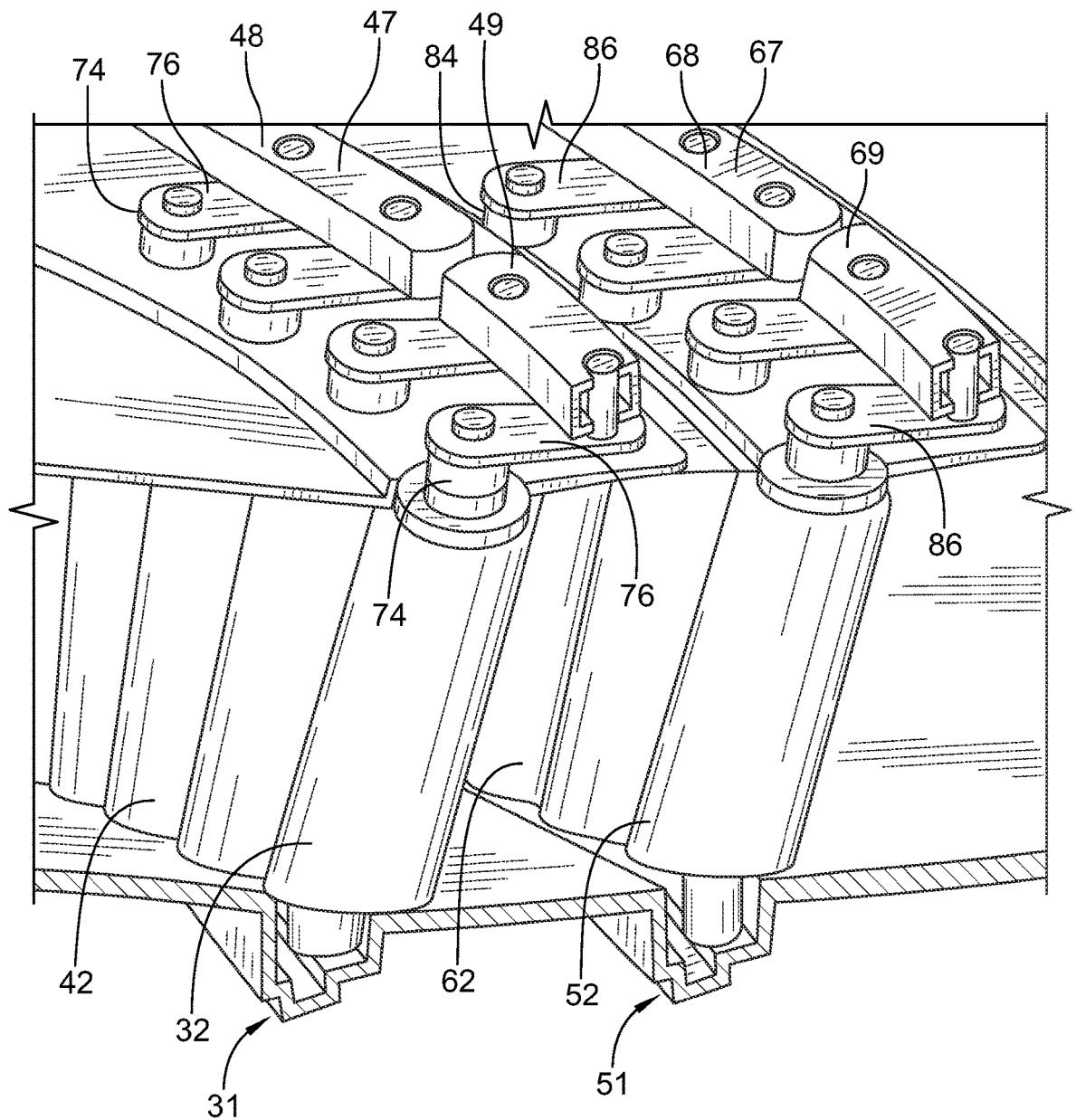
FIG. 4B is a cutaway perspective view of the outlet guide vane assembly of FIGS. 2 and 3, showing the first plurality of guide vanes and the second plurality of guide vanes each include unique groups of vanes mechanically coupled to each other.

In some embodiments, the first plurality of variable-pitch outlet guide vanes 30 includes a third variable-pitch outlet guide vane 42 different from the first variable-pitch outlet guide vane 32 and the second plurality of variable-pitch outlet guide vanes 50 includes a fourth variable-pitch outlet guide vane 62 different from the second variable-pitch outlet guide vane 52, as shown in FIG. 4B. The control system is configured to rotate the third variable-pitch outlet guide vane 62 to a third vane-pitch angle that is different than the first vane-pitch angle, and is further configured to rotate the fourth variable-pitch outlet guide vane 62 to a fourth vane-pitch angle that is different than the second vane-pitch angle.

In some embodiments, the third outlet guide vanes 42 may be mechanically tied together or ganged in a group of vanes different than a group of the first outlet guide vanes 32 which are also mechanically tied together or ganged. In this embodiment, a first connector arm 47 mechanically ties together the third outlet guide vanes 42, and a second connector arm 49 mechanically ties together the first outlet guide vanes 32. Similarly, the fourth outlet guide vanes 62 may be mechanically tied together or ganged in a group of vanes different than a group of the second outlet guide vanes 52 which are also mechanically tied together or ganged. In this embodiment, a first connector arm 67 mechanically ties together the fourth outlet guide vanes 62, and a second connector arm 69 mechanically ties together the second outlet guide vanes 52. In this embodiment, each group of guide vanes 32, 42, 52, 62 includes a single actuator 74, 84 configured to control rotation of that specific group of guide vanes 32, 42, 52, 62. Each guide vane 32, 42, 52, 62 also includes an actuator arm 76, 86 that connects the vane 32, 42, 52, 62 to its respective connector arm 47, 49, 67, 69 so as to mechanically couple each vane group together.

Figure 10:
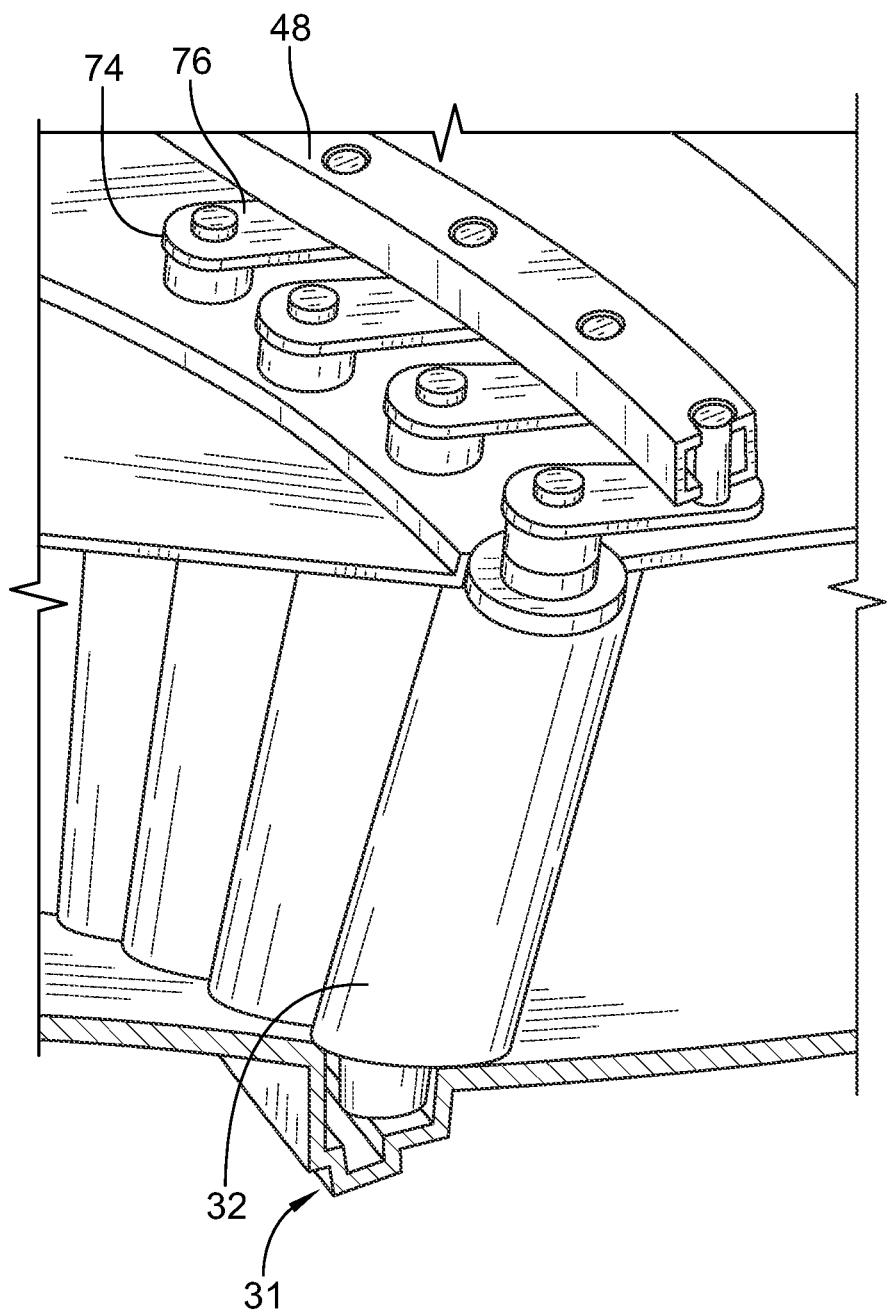
FIG. 10 is a cutaway perspective view of an outlet guide vane assembly of FIGS. 1-9, showing that a first plurality of guide vanes are mechanically ganged to each other via a connector arm that extends around a circumference of the plurality of guide vanes.
Figure 11A:
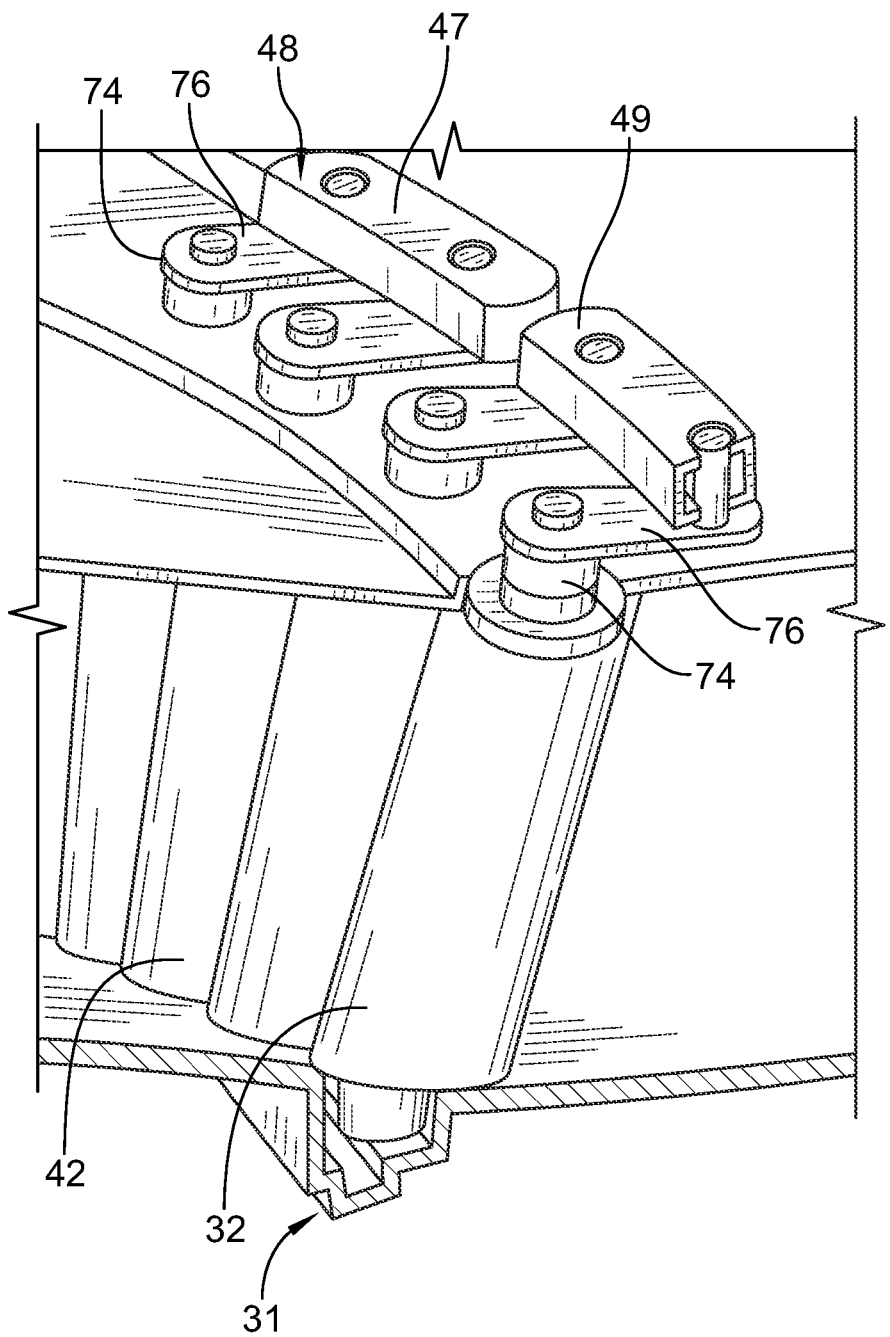
FIG. 11A is a cutaway perspective view of an outlet guide vane assembly of FIGS. 1-9, showing that a first plurality of guide vanes include unique groups of vanes mechanically ganged to each other, and showing that each group includes two vanes and a separate connector arm ganging the two vanes to each other.
Figure 11B:
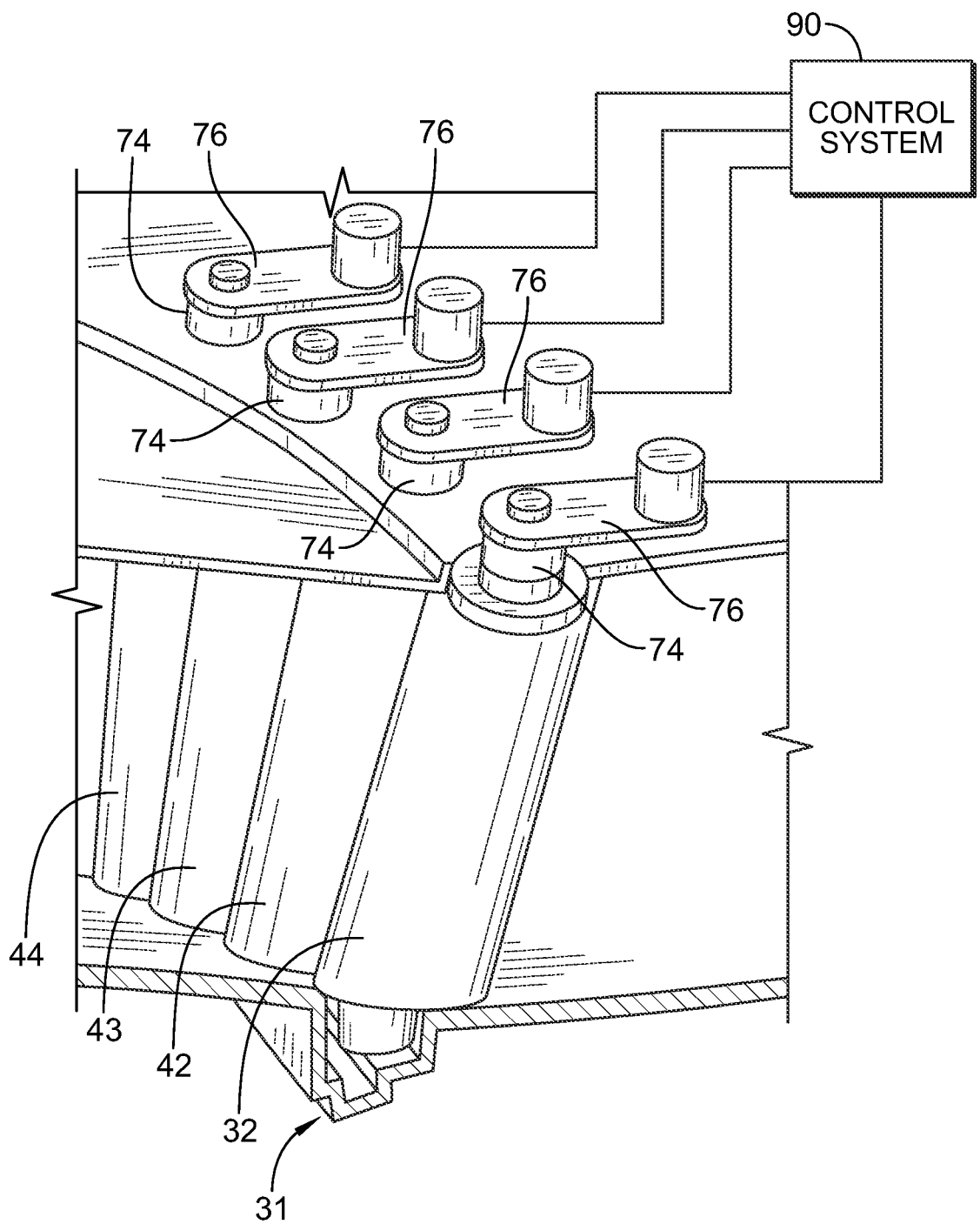
FIG. 11B is a cutaway perspective view of an outlet guide vane assembly of FIGS. 1-9, showing that each guide vane of a first plurality of guide vanes is individually controllable relative to each other guide vane, and showing that each guide vane has its own actuator operably connected to the control system.

In some embodiments, the outlet guide vane assembly 28 only includes a single row of the first plurality of outlet guide vanes 30, as shown in FIGS. 10-11B. In at least some embodiments, every vane 32 of the first plurality of outlet guide vanes 30 is mechanically connected to each other, or ganged, via a circumferentially extending connector arm 48, as shown in FIG. 10. The connector arm 48 extends entirely around the circumference of the outlet guide vane assembly 28 and is coupled to each vane 32 such that rotation of one of the vanes 32 will rotate the remainder of the vanes 32 of the first plurality of guide vanes 30. In the illustrative embodiment, the circumferentially extending connector arm 48 is shown coupled to the first actuator support arm 76 of each vane 32. In this embodiment, the first plurality of guide vanes 30 may be controlled by a single actuator 74 or multiple actuators 74 that total less than the total number of vanes 32 in the first plurality of vanes 30.

In at least one additional embodiment, the outlet guide vane assembly 28 only includes a single row of the first plurality of outlet guide vanes 30 that are broken into unique groups of vanes 32, as shown in FIG. 11A. Each group of vanes 32 is mechanically connected to each other, or ganged, via a unique circumferentially extending connector arm, for example the connector arm 47 and the connector arm 49 shown in FIG. 11A. In the illustrative embodiment, the circumferentially extending connector arms 47, 49 are shown coupled to the first actuator support arm 76 of each vane 32. In this embodiment, the first plurality of guide vanes 30 may be controlled by a single actuator 74 per group of vanes 32. Although the illustrative embodiment shows each group of vanes 32 including two vanes 32, the vanes 32 may be grouped and ganged in any combination of at least two groups of vanes totaling at least one fewer vane than the total number of vanes 32 in the plurality of outlet guide vanes 30. For example, if the first plurality of outlet guide vanes 30 includes 60 vanes, a first group may include 40 vanes and a second group may include 20 vanes. As a further non-limiting example, a first group of vanes may include 50 vanes, a second group of vanes may include five vanes, and a third group of vanes may include five vanes.

In at least some embodiments, the outlet guide vane assembly 28 only includes a single row of the first plurality of outlet guide vanes 30 that are individually controllable, as shown in FIG. 11B. Specifically, the control system 90 is further configured to rotate each vane 32 of the first plurality of guide vanes 30 individually relative to each other vane 32 such that each vane 32 can be rotated to any angle relative to each other vane 32. In the illustrative embodiment, each vane 32 includes a unique actuator 74 configured to rotate the vane 32 and operably connected to the control system 90 via an actuator arm 76.

In some embodiments, the first plurality of variable-pitch outlet guide vanes 30 includes a first group of first vanes 32 and a second group of first vanes 32 different from the first group of guide vanes 32. Similarly, the second plurality of variable-pitch outlet guide vanes 50 includes a third group of second vanes 52 and a fourth group of second vanes 52 different from the third group of second vanes 52. The control system 90 is configured to rotate the first group of first vanes 32 to a first vane-pitch angle and the second group of first vanes 32 to a third vane-pitch angle that is different from the first vane-pitch angle. Similarly, the control system 90 to rotate the third group of second vanes 52 to a second vane-pitch angle and the fourth group of second vanes 52 to a fourth vane-pitch angle that is different from the second vane-pitch angle. The groups of vanes 32, 52 may be individually controlled or each group may be ganged together. For example, in some embodiments, one half of the first plurality of outlet guide vanes 30 is the first group and the other half of the first plurality of outlet guide vanes 30 is the second group. Similarly, one half of the second plurality of outlet guide vanes 50 is the third group and the other half of the second plurality of outlet guide vanes 50 is the fourth group.

In some embodiments, the control system 90 utilizes predetermined arrangements of the first and second plurality of variable-pitch outlet guide vanes 30, 50 that are based on predetermined measurements and data taken in predetermined engine operating conditions and predetermined airflow characteristics. As such, the control system 90 is configured to rotate the first and second plurality of guide vanes 30, 50 to specific predetermined arrangements based on the operating condition and/or airflow characteristic(s) of the fan exit air 15 or the inlet air that the engine 10 and fan assembly 12 are operating in.

In other embodiments, the control system 90 includes at least one sensor 92 configured to take real-time measurements of the air flow within the fan duct passage 24 and of forces acting on the fan assembly components, as shown in FIG. 2. The real-time measurements may be utilized in order to determine the operating condition and/or airflow characteristic(s) of the fan exit air 15 or the inlet air that the engine 10 and fan assembly 12 are operating in so as to inform the control system 90 to which predetermined arrangement to rotate the first and second plurality of guide vanes 30, 50. In some embodiments, the control system 90 includes a neural network configured to perform machine learning such that the control system 90 can iterate over the predetermined arrangements in order to calculate new arrangements that are applicable to new variations in the operating condition and/or airflow characteristics that are unaccounted for by the predetermined settings and arrangements. In some embodiments, the control system 90 further includes a subsystem control that is integrated with other engine controls to further control reduction of losses created by undesirable variations in the air flow and improve engine performance and efficiency. For example, if rotation of outlet guide vanes 30, 50 resulted in a fan flow drop, the subsystem control is configured to compensate for this by increasing the fan speed in order to maintain thrust, and/or by changing the exhaust area of the engine 10 in order to further reduce the losses and improve engine efficiency.

In some embodiments, the at least one sensor 92 may be located proximate to the fan blades 22, proximate to the first and second plurality of guide vanes 30, 50, or both, as shown in FIG. 2. The at least one sensor 92 may include one of or a combination of dynamic sensors, static wall pressure sensors, altitude sensors, sensors configured to detect the angle of attack of the plurality of fan blades 22, and airspeed sensors. The sensor 92 may also be a sensor configured to measure a rotational speed of the fan blades 22.

In the illustrative embodiment, the functionality of the control system 90 described herein may be implemented in various processing and computing devices, and may be located within the engine 10 or outside of the engine 10. Moreover, the functionality may be configured to operate on executable software provided on the processing and computing devices. Furthermore, the functionality disclosed herein may be implemented in various configurations using computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Computer-executable instructions comprise, for example, instructions and data which cause a general purpose computer, special purpose computer, or special purpose processing device to perform a certain function or group of functions.

Figure 6:
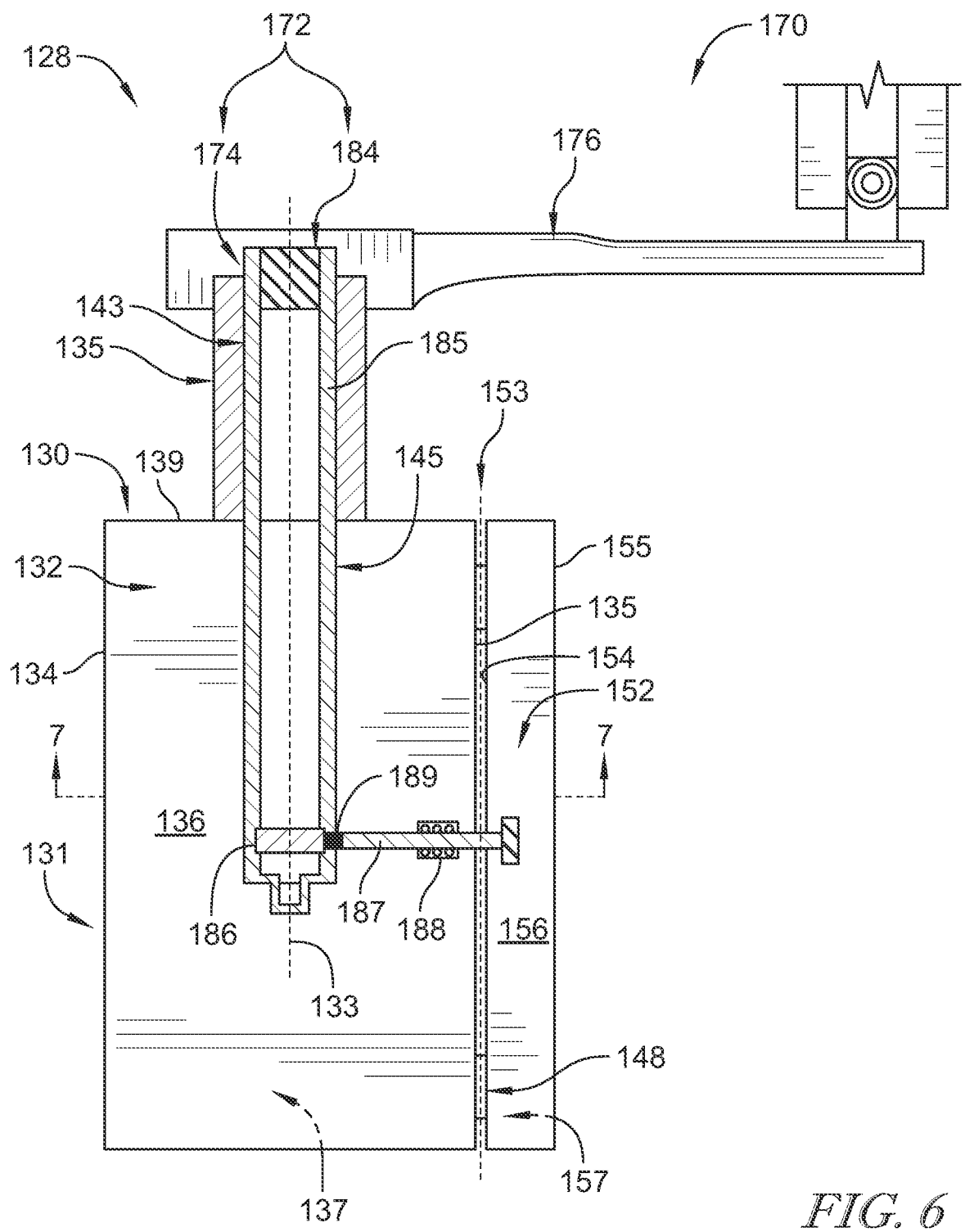
FIG. 6 is a side cross-sectional view of a variable-pitch outlet guide vane of an outlet guide vane assembly of another embodiment according to the present disclosure, showing that the variable-pitch outlet guide vane includes a leading edge portion configured to rotate about a leading edge pitch axis and a trailing edge portion rotatably coupled to an axially aft edge of the leading edge portion and configured to rotate relative to the leading edge portion about a trailing edge pitch axis that is parallel to the leading edge pitch axis, the leading edge portion and the trailing edge portion being configured to rotate to a first arrangement in order to redirect the fan exit air and minimize forces acting on the plurality of fan blades and losses created by distortions and disturbances in the fan inlet air and the fan exit air.
Figure 7:
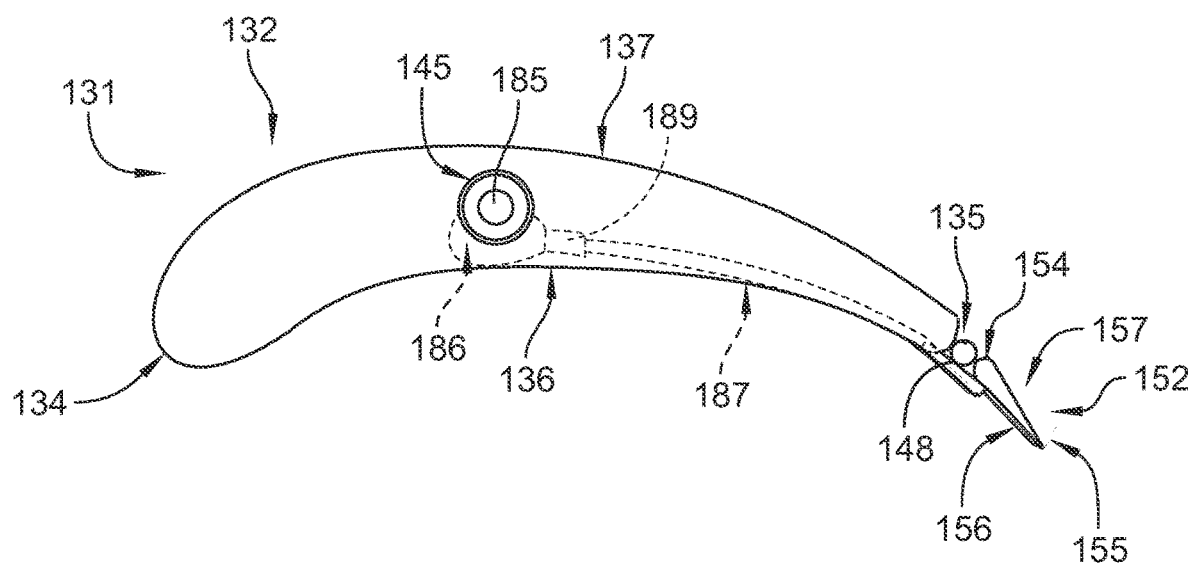
FIG. 7 is a top cross-sectional view of the outlet guide vane of FIG. 6, showing the airfoil shape of the leading edge portion and the trailing edge portion, showing a radially extending leading edge portion trim cavity within which a control rod of an actuation assembly is arranged, and showing that the trailing edge portion is rotated via a cam and a cam rod coupled to the control rod and the trailing edge portion.

A second embodiment of an outlet guide vane assembly 128 is shown in FIGS. 6 and 7. The outlet guide vane assembly 128 is similar to the outlet guide vane assembly 28 shown in FIGS. 1-5 and described herein. Accordingly, similar reference numbers in the 100 series indicate features that are common between the outlet guide vane assembly 128 and the outlet guide vane assembly 28. The description of the outlet guide vane assembly 28 is incorporated by reference to apply to the outlet guide vane assembly 128, except in instances when it conflicts with the specific description and the drawings of the outlet guide vane assembly 128.

Similar to the outlet guide vane assembly 28, the outlet guide vane assembly 128 is located in the fan duct 20 axially downstream of the inlet fan blades 22 and is configured to adjust a direction of the fan exit air 15 received from the plurality of fan blades 22. In the illustrative embodiment, the outlet guide vane assembly 128 includes a single plurality of variable-pitch outlet guide vanes 130 including a first variable-pitch outlet guide vane 131 that extends radially relative to the central axis 11, as shown in FIG. 6. The outlet guide vane assembly 128 further includes a plurality of actuation assemblies 170 including a first actuation assembly 172 connected to the first vane 131.

The first variable-pitch outlet guide vane 131 includes a leading edge portion 132 and a trailing edge portion 152 rotatably coupled to an aft end of the leading edge portion 132, as shown in FIGS. 6 and 7. The trailing edge portion 152 may be rotatably coupled to the leading edge portion 132 via a single hinge rod 148 or a plurality of hinge rods 148. In the illustrative embodiment, the trailing edge portion 152 may be rotatably coupled to the leading edge portion 132 via two hinge rods 148.

In the illustrative embodiment, the leading edge portion includes an airfoil shape having a leading edge 134 located at a forward end of the leading edge portion 132, a trailing edge 135 axially spaced apart from the leading edge 134 and located at an aft end of the leading edge portion 132, a pressure side surface 136 that extends between the leading edge 134 and the trailing edge 135 on one side of the leading edge portion 132, and a suction side surface 137 that extends between the leading edge 134 and the trailing edge 135 on an opposite side of the leading edge portion 132.

The trailing edge portion 152 similarly includes a leading edge 154 located at a forward end of the trailing edge portion 152, a trailing edge 155 axially spaced apart from the leading edge 154 and located at an aft end of the trailing edge portion 152, a pressure side surface 156 that extends between the leading edge 154 and the trailing edge 155 on one side of the trailing edge portion 152, and a suction side surface 157 that extends between the leading edge 154 and the trailing edge 155 on an opposite side of the trailing edge portion 152.

As can be seen in FIG. 7, the trailing edge 135 of the leading edge portion 132 may be formed as a rounded surface facing the leading edge 154 of the trailing edge portion 152. Similarly, the leading edge 154 of the trailing edge portion 152 may be formed as a rounded surface facing the trailing edge 135 of the leading edge portion 132. This allows for the leading edge portion 132 and the trailing edge portion 152 to rotate relative to each other. Moreover, as can be seen in FIG. 7, the cross-sectional shape of the trailing edge portion 152 continues the airfoil shape of the leading edge portion 132 such that together the leading and trailing edge portions 132, 152 form the complete airfoil shape of the vane 131.

The first actuation assembly 172 is configured to control rotation of the first variable-pitch outlet guide vane 131, as shown in FIG. 6. In particular, the first actuation assembly 172 includes a first actuator 174 is configured to rotate the leading edge portion 132 about a leading edge pitch axis 133 that extends radially from the central axis 11. The first actuation assembly 172 further includes a second actuator 184 configured to rotate the trailing edge portion 152 relative to the leading edge portion 132 about a trailing edge pitch axis 153 that is parallel to the leading edge pitch axis 133 and that passes axially through the hinge rods 148. The first actuator 174 and the second actuator 184 are coupled to an actuation arm 176 that connects the actuators 174, 184 to the control system 90 and also provides structural support for the actuators 174, 184.

Similarly to the outlet guide vane assembly 28, the control system 90 is configured to control the plurality of actuation assemblies 170, in particular the first actuation assembly 172, so as to rotate the leading edge portion 132 and the trailing edge portion 152 of each guide vane 131 of the plurality of guide vanes 130 to a first arrangement in which the leading edge portion 132 and the trailing edge portion 152 are rotated to specific angles. In particular, the first actuation assembly 172 is configured to rotate the leading edge portion 132 to a first leading edge angle in response to the gas turbine engine operating at a given operating condition so as to redirect the fan exit air 15 in a first direction and is further configured to rotate the trailing edge portion 152 to a first trailing edge angle relative to the leading edge portion 132 in order to redirect the fan exit air 15 flowing in the first direction in a second direction to minimize losses created by distortions in fan inlet air and created by the leading edge portion redirecting the fan exit air in the first direction. In the illustrative embodiment, the control system 90 is configured to rotate the trailing edge portion 152 to redirect the fan exit air 15 in a second direction different than the first direction such that the fan exit air 15 returns to an axial flow direction, or as close to axial as possible given the air flow characteristics in the fan duct 20 and the operating conditions of the engine.

In the illustrative embodiment, the first variable-pitch outlet guide vane 131 further includes a vane stem 135 extending between and connected to a radially outer end 139 of the leading edge portion 132 and to the first actuator 174, as shown in FIG. 6. The first actuator 174 is configured to rotate the vane stem 135 so as to rotate the leading edge portion 132 about the leading edge pitch axis 133. The vane stem 135 includes a vane stem trim cavity 143 formed within the vane stem 135 and extending radially and opening at a radially outer and radially inner end of the vane stem 135.

The leading edge portion 132 includes a radially extending leading edge portion trim cavity 145 formed within the leading edge portion 132 and that opens at the radially outer end 139 of the leading edge portion 132, as shown in FIG. 6. In the illustrative embodiment, the radially extending leading edge portion trim cavity 145 and the vane stem trim cavity 143 are coaxial. The first actuation assembly 172 further includes the second actuator 184 and a control rod 185 connected to the second actuator 184 and extending radially inwardly through the vane stem trim cavity 143 and into the leading edge portion trim cavity 145 of the leading edge portion 132. The control rod 185 is coaxial with the leading edge pitch axis 133 of the leading edge portion 132. The control rod 185 is configured to rotate within the cavities 143, 145 such that the leading edge portion 132 including the vane stem 135 may rotate independently of the control rod 185.

The first actuation assembly 172 further includes a cam 186 coupled to a radially inner portion of the control rod 185 and located within the leading edge portion trim cavity 145 of the leading edge portion 132, as shown in FIG. 6. The assembly 172 further includes a spring-loaded cam rod 187 having a first end and an opposite second end. The first end of the cam rod 187 includes a follower 189 that is configured to engage the cam 186. The second end is rotatably coupled to the trailing edge portion 152. In the illustrative embodiment, the cam rod 187 is located within the leading edge portion 132 and is curved such that it generally follows the contour of the pressure side surface 136 of the leading edge portion 132 and exits the leading edge portion 132 near the trailing edge 135 and extends to and couples to the trailing edge portion 152. The cam 186 and the follower 189 are also located within the leading edge portion 132.

The second actuator 184 is configured to rotate the control rod 185 so as to rotate the cam 186, as suggested by FIG. 6. The cam 186 may include a cam shape such as a wedge shape, an eccentric shape, an oval shape, an elliptical shape, or other known cam shape. As a result of the rotation of the cam 186, the shape of the cam engages the follower 189 and moves the spring-loaded cam rod 187 along a cam guide 188 in an axial direction such that the cam rod 187 rotates the trailing edge portion 152 about the trailing edge pitch axis 153. The cam guide 188 may include a spring to load the cam rod 187 towards the cam 186.

Similarly to the outlet guide vane assembly 28, the control system 90 is operable to control the leading edge portion 132 and the trailing edge portion 152 of each guide vane 131 of the plurality of guide vanes 130 in a variety of configurations and arrangements in order to compensate for inlet pressure distortion, vortices and swirl, thus reducing the forcing, stall, flutter, flow separation, and any other undesirable effects in the fan rotor or outlet vanes.

In some embodiments, the control system 90 is operably connected to the plurality of actuation assemblies 170 and is configured to rotate the leading edge portion 132 of each guide vane 131 of the plurality of guide vanes 130 in unison via first actuators 174 of each guide vane 131. The control system 90 is further configured to rotate the trailing edge portion 152 of each guide vane 131 in unison via second actuators 184 of each guide vane 131.

The control system 90 is further configured to rotate the leading edge portion 132 of each guide vane 131 of the plurality of guide vanes 130 individually relative to the other leading edge portions 132 of the plurality of guide vanes 131 and/or rotate the trailing edge portion 152 of each guide vane 131 individually relative to the other trailing edge portions 152 of the plurality of guide vanes 131. The control system 90 is also configured to rotate both the leading edge portion 132 and the trailing edge portion 152 of each guide vane 131 individually.

In some embodiments, the plurality of variable-pitch outlet guide vanes 130 includes a second variable-pitch outlet guide vane (not shown) different from the first guide vane 131. The control system 90 is configured to rotate the leading edge portion of the second variable-pitch outlet guide vane to a second leading edge portion angle that is different than the first leading edge portion angle of the leading edge portion 132 of the first guide vane 131. The control system 90 is further configured to rotate the trailing edge portion 152 of the second variable-pitch outlet guide vane to a second trailing edge portion angle that is different than the first trailing edge portion angle of the trailing edge portion 152 of the first guide vane 131.

In some embodiments, the leading edge portions 132 and the trailing edge portions 152 the leading edge portions 132 of each vane 131 may be mechanically connected to each other such that not every actuator 174 is required to rotate the leading edge portions 132. Similarly, the trailing edge portions 152 of each vane 131 may be mechanically connected to each other such that not every actuator 184 is required to rotate the trailing edge portions 152. Alternatively, each leading edge portion 132 is rotated individually to the same first vane-pitch angle and each trailing edge portion 152 is rotated individually to the same second vane-pitch angle. This would require each actuator 174, 184 to actuate the individual edge portions 132, 152.

Similarly to the outlet guide vane assembly 28, the control system 90 being configured to rotate individual edge portions 132, 152 and/or mechanically connected edge portions 132, 152 allows for the edge portions 132, 152 to be controlled in a variety of configurations. For example, if the rotation of the leading edge portions 132 causes more undesirable flow effects in certain circumferential sectors, the trailing edge portions 152 of the vanes 131 may be rotated to different angles to reduce losses from said flow effects. The trailing edge portions 152 may be each rotated individually to different vane-pitch angles to account for this. In other embodiments, the vanes 131 may be grouped into circumferential sectors, where each leading edge portion 132 and each trailing edge portion 152 of the vanes 131 of each circumferential sector are rotated to a unique leading edge portion angle and trailing edge portion angle. The rotation of the trailing edge portion 152 also reduces mechanical loading on the overall vane 130.

Figure 8:
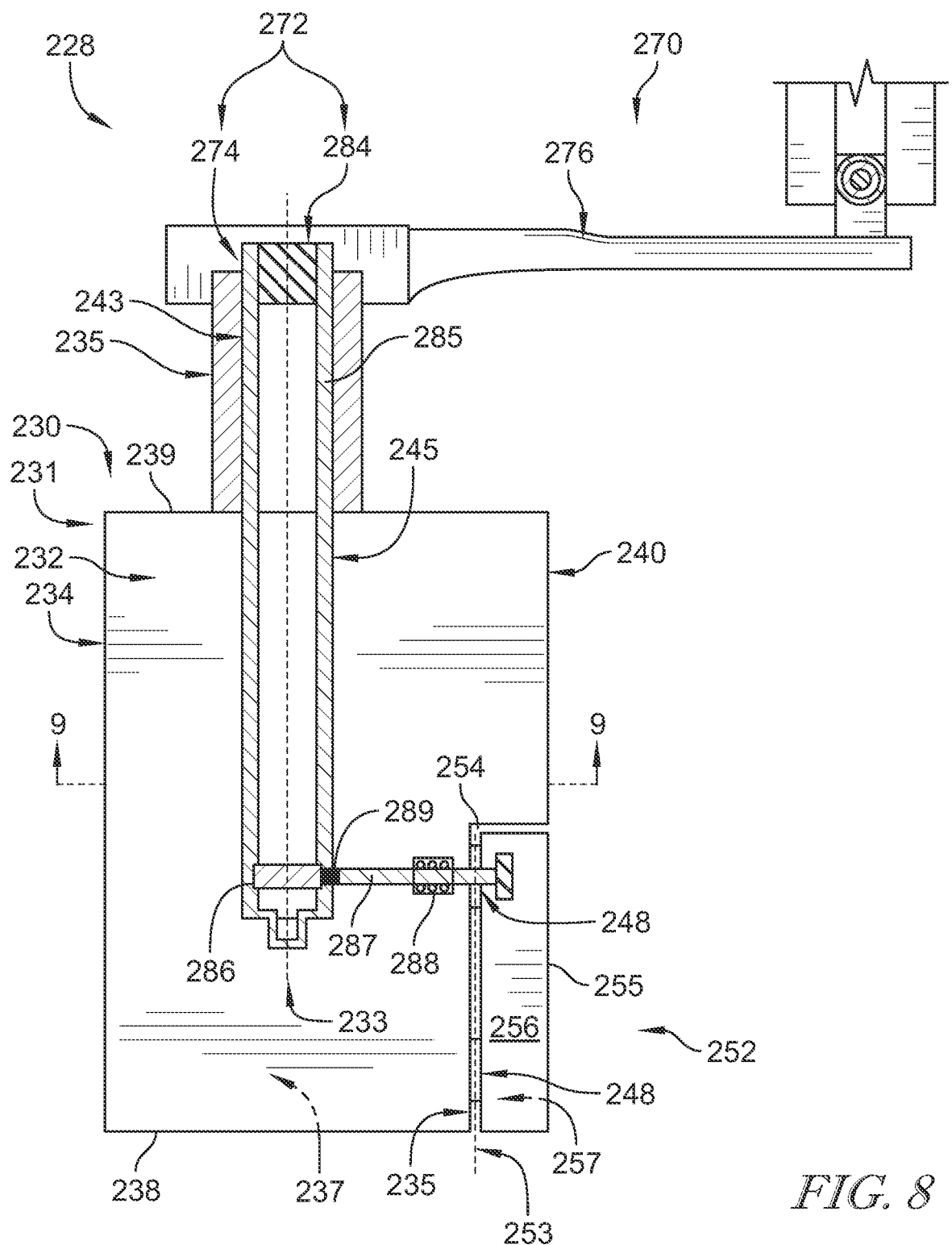
FIG. 8 is a side cross-sectional view of a variable-pitch outlet guide vane of an outlet guide vane assembly of another embodiment according to the present disclosure, showing that the variable-pitch outlet guide vane includes a leading edge portion configured to rotate about a leading edge pitch axis and a partial trailing edge portion rotatably coupled to an recessed aft end of the leading edge portion and configured to rotate relative to the leading edge portion about a trailing edge pitch axis that is parallel to the leading edge pitch axis, the leading edge portion and the trailing edge portion being configured to rotate to a first arrangement in order to redirect the fan exit air and minimize forces acting on the plurality of fan blades and losses created by distortions and disturbances in the fan inlet air and the fan exit air.
Figure 9:
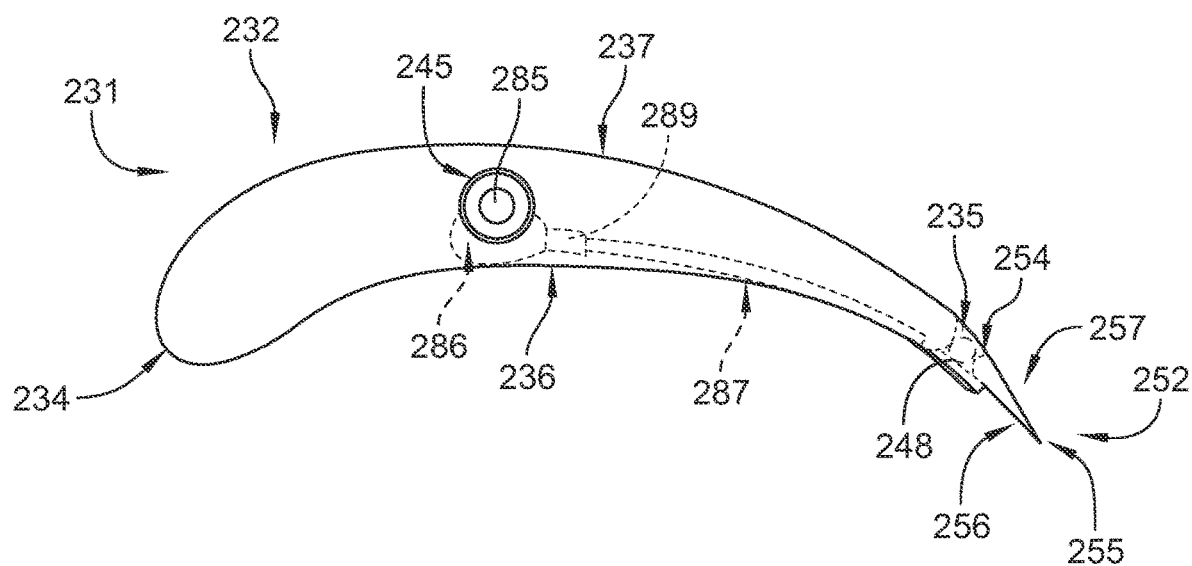
FIG. 9 is a top cross-sectional view of the outlet guide vane of FIG. 8, showing the airfoil shape of the leading edge portion and the trailing edge portion, showing a radially extending leading edge portion trim cavity within which a control rod of an actuation assembly is arranged, and showing that the trailing edge portion is rotated via a cam and a cam rod coupled to the control rod and the trailing edge portion.

A second embodiment of an outlet guide vane assembly 228 is shown in FIGS. 8 and 9. The outlet guide vane assembly 228 is similar to the outlet guide vane assemblies 28, 128 shown in FIGS. 1-7 and described herein. Accordingly, similar reference numbers in the 200 series indicate features that are common between the outlet guide vane assembly 228 and the outlet guide vane assemblies 28, 128.

The description of the outlet guide vane assemblies 28, 128 are incorporated by reference to apply to the outlet guide vane assembly 228, except in instances when it conflicts with the specific description and the drawings of the outlet guide vane assembly 228.

Similar to the outlet guide vane assembly 28, the outlet guide vane assembly 228 is located in the fan duct 20 axially downstream of the inlet fan blades 22 and is configured to adjust a direction of the fan exit air 15 received from the plurality of fan blades 22. In the illustrative embodiment, the outlet guide vane assembly 228 includes a single plurality of variable-pitch outlet guide vanes 230 including a first variable-pitch outlet guide vane 231 that extends radially relative to the central axis 11, as shown in FIG. 8. The outlet guide vane assembly 228 further includes a plurality of actuation assemblies 270 including a first actuation assembly 272 connected to the first vane 231.

The first variable-pitch outlet guide vane 231 includes a leading edge portion 232 and a partial trailing edge portion 252 rotatably coupled to a recessed aft end 235 of the leading edge portion 232, as shown in FIGS. 8 and 9. Unlike the trailing edge portion 152 of the vane 131 described above, the trailing edge portion 252 of the present embodiment only extends along a portion of the radial extent of the trailing edge of the leading edge portion 252, as shown in FIG. 8. The trailing edge portion 252 may be rotatably coupled to the leading edge portion 232 via a single hinge rod 248 or a plurality of hinge rods 248. In the illustrative embodiment, the trailing edge portion 252 may be rotatably coupled to the leading edge portion 232 via two hinge rods 248.

In the illustrative embodiment, the leading edge portion includes an airfoil shape having a leading edge 234 located at a forward end of the leading edge portion 232, an aftmost trailing edge 238 axially spaced apart from the leading edge 234 and located at an axially aftmost end of the leading edge portion 232, the recessed aft end 235 located axially forward of the aftmost trailing edge 238. The leading edge portion 232 further includes a pressure side surface 236 that extends between the leading edge 234 and the aftmost trailing edge 238 and the recessed aft end 235 on one side of the leading edge portion 232, and a suction side surface 237 that extends between the leading edge 234 and the aftmost trailing edge 238 and the recessed aft end 235 on an opposite side of the leading edge portion 232.

The trailing edge portion 252 similarly includes a leading edge 254 located at a forward end of the trailing edge portion 252, a trailing edge 255 axially spaced apart from the leading edge 254 and located at an aft end of the trailing edge portion 252, a pressure side surface 256 that extends between the leading edge 254 and the trailing edge 255 on one side of the trailing edge portion 252, and a suction side surface 257 that extends between the leading edge 254 and the trailing edge 255 on an opposite side of the trailing edge portion 252. In the illustrative embodiment, the axial extent of the trailing edge portion 252 from the leading edge 254 to the trailing edge 255 is sized such that the trailing edge 255 is axially aligned with the aftmost trailing edge 238 of the leading edge portion 232.

Moreover, the trailing edge portion 252 is sized radially to be approximately half of the radial extent of the leading edge portion 232, and is arranged such that a radially inner end of the trailing edge portion 252 is co-radial with a radially inner end 238 of the vane 231. In other embodiments, the trailing edge portion 252 is sized radially to be approximately half of the radial extent of the leading edge portion 232, and is arranged such that a radially outer end of the trailing edge portion 252 is co-radial with a radially outer end 239 of the vane 231. In other embodiments, the trailing edge portion 252 is sized radially to be more than half of the radial extent of the leading edge portion 232, and is arranged such that the radially inner end of the trailing edge portion 252 is co-radial with the radially inner end 238 of the vane 231. In other embodiments, the trailing edge portion 252 is sized radially to be more than half of the radial extent of the leading edge portion 232, and is arranged such that the radially outer end of the trailing edge portion 252 is co-radial with the radially outer end 239 of the vane 231.

In other embodiments, the trailing edge portion 252 is sized radially to be less than half of the radial extent of the leading edge portion 232, and is arranged such that the radially inner end of the trailing edge portion 252 is co-radial with the radially inner end 238 of the vane 231. In other embodiments, the trailing edge portion 252 is sized radially to be less than half of the radial extent of the leading edge portion 232, and is arranged such that the radially outer end of the trailing edge portion 252 is co-radial with the radially outer end 239 of the vane 231. In other embodiments, the trailing edge portion 252 is arranged radially between the radially outer end 239 and the radially inner end 238 of the vane 231 such that neither the radially outer end or the radially inner end of the trailing edge portion 252 is co-radial with the radially inner end 238 and the radially outer end 239 of the vane 231.

As can be seen in FIG. 9, the recessed trailing edge 235 of the leading edge portion 232 may be formed as a rounded surface facing the leading edge 254 of the trailing edge portion 252. Similarly, the leading edge 254 of the trailing edge portion 252 may be formed as a rounded surface facing the recessed trailing edge 235 of the leading edge portion 232. This allows for the leading edge portion 232 and the trailing edge portion 252 to rotate relative to each other. Moreover, as can be seen in FIG. 9, the cross-sectional shape of the trailing edge portion 252 continues the airfoil shape of the leading edge portion 232 such that together the leading and trailing edge portions 232, 252 form the complete airfoil shape of the vane 231.

The first actuation assembly 272 is configured to control rotation of the first variable-pitch outlet guide vane 231, as shown in FIG. 8. In particular, the first actuation assembly 272 includes a first actuator 274 is configured to rotate the leading edge portion 232 about a leading edge pitch axis 233 that extends radially from the central axis 11. The first actuation assembly 272 further includes a second actuator 284 configured to rotate the trailing edge portion 252 relative to the leading edge portion 232 about a trailing edge pitch axis 253 that is parallel to the leading edge pitch axis 233 and that passes axially through the hinge rods 248. The first actuator 274 and the second actuator 284 are coupled to an actuation arm 276 that connects the actuators 274, 284 to the control system 90 and also provides structural support for the actuators 274, 284.

Similarly to the outlet guide vane assemblies 28, 128, the control system 90 is configured to control the plurality of actuation assemblies 270, in particular the first actuation assembly 272, so as to rotate the leading edge portion 232 and the trailing edge portion 252 of each guide vane 231 of the plurality of guide vanes 230 to a first arrangement in which the leading edge portion 232 and the trailing edge portion 252 are rotated to specific angles. In particular, the first actuation assembly 272 is configured to rotate the leading edge portion 232 to a first leading edge angle in response to the gas turbine engine operating at a given operating condition so as to redirect the fan exit air 15 in a first direction and is further configured to rotate the trailing edge portion 252 to a first trailing edge angle relative to the leading edge portion 232 in order to redirect the fan exit air 15 flowing along the portion of the leading edge portion 232 radially aligned with the trailing edge portion 252 in a first direction in a second direction to minimize losses created by distortions in fan inlet air and created by the leading edge portion redirecting the fan exit air in the first direction. In the illustrative embodiment, the control system 90 is configured to rotate the trailing edge portion 252 to redirect the fan exit air 15 in a second direction different than the first direction such that the fan exit air 15 returns to an axial flow direction, or as close to axial as possible given the air flow characteristics in the fan duct 20 and the operating conditions of the engine.

In the illustrative embodiment, the first variable-pitch outlet guide vane 231 further includes a vane stem 235 extending between and connected to a radially outer end 239 of the leading edge portion 232 and to the first actuator 274, as shown in FIG. 8. The first actuator 274 is configured to rotate the vane stem 235 so as to rotate the leading edge portion 232 about the leading edge pitch axis 233. The vane stem 235 includes a vane stem trim cavity 243 formed within the vane stem 235 and extending radially and opening at a radially outer and radially inner end of the vane stem 235.

The leading edge portion 232 includes a radially extending leading edge portion trim cavity 245 formed within the leading edge portion 232 and that opens at the radially outer end 239 of the leading edge portion 232, as shown in FIG. 8. In the illustrative embodiment, the radially extending leading edge portion trim cavity 245 and the vane stem trim cavity 243 are coaxial. The first actuation assembly 272 further includes the second actuator 284 and a control rod 285 connected to the second actuator 284 and extending radially inwardly through the vane stem trim cavity 243 and into the leading edge portion trim cavity 245 of the leading edge portion 232. The control rod 285 is coaxial with the leading edge pitch axis 233 of the leading edge portion 232. The control rod 285 is configured to rotate within the cavities 243, 245 such that the leading edge portion 232 including the vane stem 235 may rotate independently of the control rod 285.

The first actuation assembly 272 further includes a cam 286 coupled to a radially inner portion of the control rod 285 and located within the leading edge portion trim cavity 245 of the leading edge portion 232, as shown in FIG. 8. The assembly 272 further includes a spring-loaded cam rod 287 having a first end and an opposite second end. The first end of the cam rod 287 includes a follower 289 that is configured to engage the cam 286. The second end is rotatably coupled to the trailing edge portion 252. In the illustrative embodiment, the cam rod 287 is located within the leading edge portion 232 and is curved such that it generally follows the contour of the pressure side surface 236 of the leading edge portion 232 and exits the leading edge portion 232 near the trailing edge 235 and extends to and couples to the trailing edge portion 252. The cam 286 and the follower 289 are also located within the leading edge portion 232.

The second actuator 284 is configured to rotate the control rod 285 so as to rotate the cam 286, as suggested by FIG. 8. The cam 286 may include a cam shape such as a wedge shape, an eccentric shape, an oval shape, an elliptical shape, or other known cam shape. As a result of the rotation of the cam 286, the shape of the cam engages the follower 289 and moves the spring-loaded cam rod 287 along a cam guide 288 in an axial direction such that the cam rod 287 rotates the trailing edge portion 252 about the trailing edge pitch axis 253. The cam guide 288 may include a spring to load the cam rod 287 towards the cam 286.

Similarly to the outlet guide vane assemblies 28, 128, the control system 90 is operable to control the leading edge portion 232 and the trailing edge portion 252 of each guide vane 231 of the plurality of guide vanes 230 in a variety of configurations and arrangements in order to compensate for inlet pressure distortion, vortices and swirl, thus reducing the forcing, stall, flutter, flow separation, and any other undesirable effects in the fan rotor or outlet vanes. In some embodiments, the control system 90 is operably connected to the plurality of actuation assemblies 270 and is configured to rotate the leading edge portion 232 of each guide vane 231 of the plurality of guide vanes 230 in unison via first actuators 274 of each guide vane 231. The control system 90 is further configured to rotate the trailing edge portion 252 of each guide vane 231 in unison via second actuators 284 of each guide vane 231.

The control system 90 is further configured to rotate the leading edge portion 232 of each guide vane 231 of the plurality of guide vanes 230 individually relative to the other leading edge portions 232 of the plurality of guide vanes 231 and/or rotate the trailing edge portion 252 of each guide vane 231 individually relative to the other trailing edge portions 252 of the plurality of guide vanes 231. The control system 90 is also configured to rotate both the leading edge portion 232 and the trailing edge portion 252 of each guide vane 231 individually.

In some embodiments, the plurality of variable-pitch outlet guide vanes 230 includes a second variable-pitch outlet guide vane (not shown) different from the first guide vane 231. The control system 90 is configured to rotate the leading edge portion of the second variable-pitch outlet guide vane to a second leading edge portion angle that is different than the first leading edge portion angle of the leading edge portion 232 of the first guide vane 231. The control system 90 is further configured to rotate the trailing edge portion 252 of the second variable-pitch outlet guide vane to a second trailing edge portion angle that is different than the first trailing edge portion angle of the trailing edge portion 252 of the first guide vane 231.

In some embodiments, the leading edge portions 232 and the trailing edge portions 252 the leading edge portions 232 of each vane 231 may be mechanically connected to each other such that not every actuator 274 is required to rotate the leading edge portions 232. Similarly, the trailing edge portions 252 of each vane 231 may be mechanically connected to each other such that not every actuator 284 is required to rotate the trailing edge portions 252. Alternatively, each leading edge portion 232 is rotated individually to the same first vane-pitch angle and each trailing edge portion 252 is rotated individually to the same second vane-pitch angle. This would require each actuator 274, 284 to actuate the individual edge portions 232, 252.

Similarly to the outlet guide vane assemblies 28, 128, the control system 90 being configured to rotate individual edge portions 232, 252 and/or mechanically connected edge portions 232, 252 allows for the edge portions 232, 252 to be controlled in a variety of configurations. For example, if the rotation of the leading edge portions 232 causes more undesirable flow effects in certain circumferential sectors, the trailing edge portions 252 of the vanes 231 may be rotated to different angles to reduce losses from said flow effects. The trailing edge portions 252 may be each rotated individually to different vane-pitch angles to account for this. In other embodiments, the vanes 231 may be grouped into circumferential sectors, where each leading edge portion 232 and each trailing edge portion 252 of the vanes 231 of each circumferential sector are rotated to a unique leading edge portion angle and trailing edge portion angle.

In some embodiments of the present disclosure, an outlet guide vane assembly includes a plurality of variable-pitch outlet guide vanes may include a combination of variable-pitch outlet guide vanes 30, 50, variable-pitch outlet guide vanes 130, and variable-pitch outlet guide vanes 230. For example, in some embodiments, the outlet guide vane assembly includes a first row of variable-pitch outlet guide vanes 30 and a second row located axially aft of the first row of variable-pitch outlet guide vanes 130 or variable-pitch outlet guide vanes 230. In other embodiments, the first row of variable-pitch outlet guide vanes includes at least one first circumferential sector that includes the variable-pitch outlet guide vanes 30 and at least one second circumferential sector that includes the variable-pitch outlet guide vanes 130 or the variable-pitch outlet guide vanes 230. This embodiment may also include a similar second row of variable-pitch outlet guide vanes that include a similar combination of vanes.

In some embodiments, the leading edge portions 132, 232 of each variable-pitch outlet guide vane 130, 230 is ganged together, and the trailing edge portions 152, 252 of each variable-pitch outlet guide vane 130, 230 is ganged together. In some embodiments, unique groups of the leading edge portions 132, 232 of some variable-pitch outlet guide vanes 130, 230 are ganged together, and unique groups of the trailing edge portions 152, 252 of some variable-pitch outlet guide vanes 130, 230 are ganged together. In some embodiments, each leading edge portions 132, 232 is mechanically tied to its respective trailing edge portion 152, 252 such that rotation of the leading edge portion 132, 232 causes rotation of the trailing edge portion 152, 252.

In some embodiments, all of the leading edge portions 132, 232 of each variable-pitch outlet guide vane 130, 230 are ganged together, while only unique groups of the trailing edge portions 152, 252 of some variable-pitch outlet guide vanes 130, 230 are ganged together. In some embodiments, all of the the trailing edge portions 152, 252 of each variable-pitch outlet guide vane 130, 230 are ganged together, while only unique groups of the leading edge portions 132, 232 of some variable-pitch outlet guide vanes 130, 230 are ganged together. The ganging and mechanical tying of the leading and trailing edge portions 132, 232, 152, 252 of the vanes 130, 230 may be applicable to multiple rows of vanes as well.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A fan assembly for a gas turbine engine the fan assembly comprising
    a fan duct arranged circumferentially around a central axis,
    an inlet fan comprising a plurality of fan blades that extend radially outward relative to the central axis and that are adapted to rotate about the central axis to force fan exit air toward an aft end of the fan duct, and
    an outlet guide vane assembly located in the fan duct axially downstream of the inlet fan and configured to adjust a direction of the fan exit air received from the plurality of fan blades, the outlet guide vane assembly including
    a first plurality of variable-pitch outlet guide vanes including at least one first variable-pitch outlet guide vane and at least one second variable-pitch outlet guide vane that each extend radially outward relative to the central axis, the first variable-pitch outlet guide vane being configured to rotate about a first pitch axis to a first vane-pitch angle in response to the gas turbine engine operating at a given operating condition so as to redirect the fan exit air in a first direction, the at least one second variable-pitch outlet guide vane being located at a different circumferential position than the first variable-pitch outlet guide vane and being configured to rotate about a second pitch axis to a second vane-pitch angle in response to the gas turbine engine operating at the given operating condition so as to redirect the fan exit air in a second direction,
    a second plurality of variable-pitch outlet guide vanes located axially downstream of the first plurality of variable-pitch outlet guide vanes and including at least one third variable-pitch outlet guide vane and at least one fourth variable-pitch outlet guide vane that each extend radially outward relative to the central axis, and
    a plurality of first actuator arms, each first actuator arm being operably coupled to a respective first or second variable-pitch outlet guide vane of the first plurality of variable-pitch outlet guide vanes, wherein rotation of each first or second variable-pitch outlet guide vane of the first plurality of variable-pitch outlet guide vanes is caused by pivoting movement of a respective first actuator arm of the plurality of first actuator arms,
    wherein each first actuator arm of the plurality of first actuator arms extends from the respective first or second variable-pitch outlet guide vane of the first plurality of variable-pitch outlet guide vanes axially aft and beyond leading edges of the third or fourth variable-pitch outlet guide vanes of the second plurality of variable-pitch outlet guide vanes.

2. The fan assembly of claim 1, further comprising:
    a control system configured to rotate the first plurality of variable-pitch outlet guide vanes,
    wherein the control system is configured to rotate the at least one first variable-pitch outlet guide vane of the first plurality of variable-pitch outlet guide vanes to the first vane-pitch angle and to rotate the at least one second variable-pitch outlet guide vane of the second plurality of variable-pitch outlet guide vanes to the second vane-pitch angle.

3. The fan assembly of claim 2, wherein the first vane-pitch angle is different than the second vane-pitch angle.

4. The fan assembly of claim 3, wherein the at least one first variable-pitch outlet guide vane of the first plurality of variable-pitch outlet guide vanes includes at least two variable-pitch outlet guide vanes that are ganged with each other.

5. The fan assembly of claim 4, further comprising:
    a first connector arm that extends at least partially circumferentially about the central axis and that is coupled to each variable-pitch outlet guide vane of the at least two variable-pitch outlet guide vanes so as to gang the at least two variable-pitch outlet guide vanes together.

6. The fan assembly of claim 5, wherein the at least one first actuator is operably coupled to the first connector arm, and wherein the at least one first actuator being configured to rotate at least one first variable-pitch outlet guide vane of the at least two variable-pitch outlet guide vanes so as to rotate every other first variable-pitch outlet guide vane of the of the at least two variable-pitch outlet guide vanes via the first connector arm.

7. The fan assembly of claim 3, wherein the at least one first variable-pitch outlet guide vane of the first plurality of variable-pitch outlet guide vanes includes at least two first variable-pitch outlet guide vanes that are each mechanically connected to each other, and the at least one second variable-pitch outlet guide vane of the first plurality of variable-pitch outlet guide vanes includes at least two second variable-pitch outlet guide vanes that are each mechanically connected to each other.

8. The fan assembly of claim 7, wherein the at least two first variable-pitch outlet guide vanes of the at least one first variable-pitch outlet guide vane of the first plurality of variable-pitch outlet guide vanes are ganged with each other, and the at least two second variable-pitch outlet guide vanes of the at least one second variable-pitch outlet guide vane of second plurality of variable-pitch outlet guide vanes are ganged with each other.

9. The fan assembly of claim 8, wherein the at least two first variable-pitch outlet guide vanes that are ganged with each other include at least five vanes, and wherein the at least two second variable-pitch outlet guide vanes that are ganged with each other include at least five vanes.

10. The fan assembly of claim 8, wherein the at least two first variable-pitch outlet guide vanes that are ganged with each other are configured to be fully closed while the at least two second variable-pitch outlet guide vanes that are ganged with each other are fully open in order to reduce a tendency for a local stall of the inlet fan.

11. The fan assembly of claim 3, further comprising:
at least one third variable-pitch outlet guide vane that extends radially outward relative to the central axis, the third variable-pitch outlet guide vane being located at a different circumferential position than the first variable-pitch outlet guide vane and the second variable-pitch outlet guide vane, the third variable-pitch outlet guide vane being configured to rotate about a third pitch axis to a third vane-pitch angle in response to the gas turbine engine operating at the given operating condition so as to redirect the fan exit air in a third direction.

12. The fan assembly of claim 11, wherein the third vane-pitch angle is different than the first vane-pitch angle and the second vane-pitch angle.

13. The fan assembly of claim 3,
wherein the third variable-pitch outlet guide vane is configured to rotate, via the control system, about a third pitch axis to a third vane-pitch angle in response to the gas turbine engine operating at the given operating condition so as to redirect the fan exit air in a third direction, and wherein the fourth variable-pitch outlet guide vane is located at a different circumferential position than the third variable-pitch outlet guide vane and is configured to rotate about a fourth pitch axis to a fourth vane-pitch angle in response to the gas turbine engine operating at the given operating condition so as to redirect the fan exit air in a fourth direction.

14. A fan assembly for a gas turbine engine the fan assembly comprising
a fan duct arranged circumferentially around a central axis,
an inlet fan comprising a plurality of fan blades adapted to force an airflow toward an aft end of the fan duct, and
an outlet guide vane assembly located in the fan duct axially downstream of the inlet fan, the outlet guide vane assembly including
a first plurality of variable-pitch outlet guide vanes including at least one first variable-pitch outlet guide vane and at least one second variable-pitch outlet guide vane, the first variable-pitch outlet guide vane being configured to rotate in response to the gas turbine engine operating at a given operating condition so as to redirect fan exit air in a first direction, the second variable-pitch outlet guide vane being located at a different circumferential position than the first variable-pitch outlet guide vane and being configured to rotate in response to the gas turbine engine operating at the given operating condition so as to redirect the fan exit air in a second direction,
a second plurality of variable-pitch outlet guide vanes located axially downstream of the first plurality of variable-pitch outlet guide vanes and including at least one third variable-pitch outlet guide vane and at least one fourth variable-pitch outlet guide vane that each extend radially outward relative to the central axis, and
a plurality of first actuator arms, each first actuator arm being operably coupled to a respective first or second variable-pitch outlet guide vane of the first plurality of variable-pitch outlet guide vanes, wherein rotation of each first or second variable-pitch outlet guide vane of the first plurality of variable-pitch outlet guide vanes is caused by pivoting movement of a respective first actuator arm of the plurality of first actuator arms,
wherein each first actuator arm of the plurality of first actuator arms extends from the respective first or second variable-pitch outlet guide vane of the first plurality of variable-pitch outlet guide vanes axially aft and beyond leading edges of the third or fourth variable-pitch outlet guide vanes of the second plurality of variable-pitch outlet guide vanes.

15. The fan assembly of claim 14, further comprising:
a control system configured to rotate the first plurality of variable-pitch outlet guide vanes,
wherein the control system is configured to rotate the at least one first variable-pitch outlet guide vane of the first plurality of variable-pitch outlet guide vanes to a first vane-pitch angle and to rotate the at least one second variable-pitch outlet guide vane of the second plurality of variable-pitch outlet guide vanes to a second vane-pitch angle, and
wherein the first vane-pitch angle is different than the second vane-pitch angle.

16. The fan assembly of claim 15, wherein the at least one first variable-pitch outlet guide vane of the first plurality of variable-pitch outlet guide vanes includes at least two first variable-pitch outlet guide vanes that are each mechanically connected to each other, and the at least one second variable-pitch outlet guide vane of the first plurality of variable-pitch outlet guide vanes includes at least two second variable-pitch outlet guide vanes that are each mechanically connected to each other.

17. The fan assembly of claim 15, wherein the first plurality of variable-pitch outlet guide vanes includes first and/or second guide vanes arranged around a first half of an entirety of a circumference of the fan duct, wherein the first and/or second guide vanes arranged around the first half are ganged to each other, wherein the first plurality of variable-pitch outlet guide vanes includes first and/or second guide vanes arranged around a second half of the entirety of a circumference of the fan duct, and wherein the first and/or second guide vanes arranged around the second half are ganged to each other.

\* \* \* \* \*